US011966838B2

(12) United States Patent
Muller et al.

(10) Patent No.: US 11,966,838 B2
(45) Date of Patent: Apr. 23, 2024

(54) BEHAVIOR-GUIDED PATH PLANNING IN AUTONOMOUS MACHINE APPLICATIONS

(71) Applicant: NVIDIA Corporation, San Jose, CA (US)

(72) Inventors: Urs Muller, Keyport, NJ (US);
Mariusz Bojarski, Brooklyn, NY (US);
Chenyi Chen, Fremont, CA (US);
Bernhard Firner, Highland Park, NJ (US)

(73) Assignee: NVIDIA Corporation, Santa Clara, CA (US)

( * ) Notice: Subject to any disclaimer, the term of this patent is extended or adjusted under 35 U.S.C. 154(b) by 519 days.

(21) Appl. No.: 16/409,056

(22) Filed: May 10, 2019

(65) Prior Publication Data

US 2019/0384303 A1 Dec. 19, 2019

Related U.S. Application Data

(60) Provisional application No. 62/687,200, filed on Jun. 19, 2018.

(51) Int. Cl.
*G06N 3/08* (2023.01)
*G05D 1/00* (2006.01)
(Continued)

(52) U.S. Cl.
CPC ............. *G06N 3/08* (2013.01); *G05D 1/0221* (2013.01); *G05D 1/0246* (2013.01);
(Continued)

(58) Field of Classification Search
None
See application file for complete search history.

(56) References Cited

U.S. PATENT DOCUMENTS 7,221,797 B2    5/2007    Koshizen et al.
7,409,295 B2    8/2008    Paradie
(Continued)

FOREIGN PATENT DOCUMENTS

CN    106023211 A    10/2016
CN    106600650 A    4/2017
(Continued)

OTHER PUBLICATIONS

Bojarski et al: "End to End Learning for Self-Driving Cars", Apr. 25, 2016 (Apr. 25, 2016), XP055570062, Retrieved from the Internet on Mar. 18, 2019: URL:https://nvidia.com/content/tegra/automotive/images/2016/solutions/pdf/end-to-end-dl-using-px.pdf.
(Continued)

*Primary Examiner* — Ig T An
(74) *Attorney, Agent, or Firm* — Taylor English Duma L.L.P.

(57) ABSTRACT

In various examples, a machine learning model—such as a deep neural network (DNN)—may be trained to use image data and/or other sensor data as inputs to generate two-dimensional or three-dimensional trajectory points in world space, a vehicle orientation, and/or a vehicle state. For example, sensor data that represents orientation, steering information, and/or speed of a vehicle may be collected and used to automatically generate a trajectory for use as ground truth data for training the DNN. Once deployed, the trajectory points, the vehicle orientation, and/or the vehicle state may be used by a control component (e.g., a vehicle controller) for controlling the vehicle through a physical environment. For example, the control component may use these outputs of the DNN to determine a control profile (e.g., steering, decelerating, and/or accelerating) specific to the vehicle for controlling the vehicle through the physical environment.

20 Claims, 13 Drawing Sheets

(51) Int. Cl.
*G05D 1/02* (2020.01)
*G06N 20/00* (2019.01)
*G06V 10/774* (2022.01)
*G06V 20/56* (2022.01)

(52) U.S. Cl.
CPC .......... *G05D 1/0257* (2013.01); *G05D 1/027* (2013.01); *G06N 20/00* (2019.01); *G06V 10/774* (2022.01); *G06V 20/56* (2022.01); *G05D 2201/0213* (2013.01)

(56) References Cited

U.S. PATENT DOCUMENTS

| | | | |
|---|---|---|---|
| 7,565,006 | B2 | 7/2009 | Stam et al. |
| 8,204,642 | B2 | 6/2012 | Tanaka et al. |
| 9,373,057 | B1 | 6/2016 | Erhan et al. |
| 9,701,307 | B1 | 7/2017 | Newman et al. |
| 10,007,269 | B1 | 6/2018 | Gray |
| 10,053,091 | B2 | 8/2018 | Jiang et al. |
| 10,108,867 | B1 | 10/2018 | Vallespi-Gonzalez et al. |
| 10,133,274 | B2 | 11/2018 | Shashua et al. |
| 10,134,278 | B1 | 11/2018 | Konrardy et al. |
| 10,137,896 | B2 | 11/2018 | Zhuang et al. |
| 10,139,831 | B2 | 11/2018 | Yan |
| 10,157,331 | B1 | 12/2018 | Tang et al. |
| 10,363,960 | B2 | 7/2019 | Stefan et al. |
| 10,489,972 | B2 | 11/2019 | Atsmon |
| 10,580,158 | B1 | 3/2020 | Mousavian et al. |
| 10,625,748 | B1 | 4/2020 | Dong et al. |
| 10,635,110 | B2 | 4/2020 | Shashua et al. |
| 10,730,517 | B2 | 8/2020 | Park et al. |
| 10,739,778 | B2 | 8/2020 | Winkler et al. |
| 10,740,954 | B2 | 8/2020 | Liu |
| 10,776,985 | B2 | 9/2020 | Liu et al. |
| 10,816,978 | B1 | 10/2020 | Schwalb |
| 10,829,793 | B2 | 11/2020 | Arikawa et al. |
| 10,885,698 | B2 | 1/2021 | Muthler et al. |
| 10,942,030 | B2 | 3/2021 | Haque et al. |
| 10,997,433 | B2 | 5/2021 | Xu et al. |
| 11,079,764 | B2 | 8/2021 | Nister et al. |
| 11,080,590 | B2 | 8/2021 | Smolyanskiy et al. |
| 11,099,558 | B2 | 8/2021 | Huang et al. |
| 2004/0252864 | A1 | 12/2004 | Chang et al. |
| 2007/0021912 | A1 | 1/2007 | Morita et al. |
| 2007/0154068 | A1 | 7/2007 | Stein et al. |
| 2007/0182528 | A1 | 8/2007 | Breed et al. |
| 2009/0256840 | A1 | 10/2009 | Varadhan et al. |
| 2015/0054824 | A1 | 2/2015 | Jiang |
| 2015/0346716 | A1 | 12/2015 | Scharfe et al. |
| 2016/0247290 | A1 | 8/2016 | Liu et al. |
| 2016/0321074 | A1 | 11/2016 | Hung et al. |
| 2017/0010108 | A1 | 1/2017 | Shashua |
| 2017/0090478 | A1 | 3/2017 | Blayvas et al. |
| 2017/0220876 | A1 | 8/2017 | Gao et al. |
| 2017/0236013 | A1 | 8/2017 | Clayton et al. |
| 2017/0259801 | A1 | 9/2017 | Abou-Nasr et al. |
| 2017/0344808 | A1 | 11/2017 | El-Khamy et al. |
| 2017/0364083 | A1 | 12/2017 | Yang et al. |
| 2017/0371340 | A1 | 12/2017 | Cohen et al. |
| 2018/0089833 | A1 | 3/2018 | Lewis et al. |
| 2018/0121273 | A1 | 5/2018 | Fortino et al. |
| 2018/0136332 | A1 | 5/2018 | Barfield, Jr. et al. |
| 2018/0158244 | A1 | 6/2018 | Ybanez Zepeda et al. |
| 2018/0173240 | A1 | 6/2018 | Fang et al. |
| 2018/0188059 | A1 | 7/2018 | Wheeler et al. |
| 2018/0203959 | A1 | 7/2018 | Refsnaes et al. |
| 2018/0232663 | A1 | 8/2018 | Ross et al. |
| 2018/0239361 | A1 | 8/2018 | Micks et al. |
| 2018/0251153 | A1 | 9/2018 | Li et al. |
| 2018/0267558 | A1 | 9/2018 | Tiwari et al. |
| 2018/0275657 | A1 | 9/2018 | You |
| 2018/0276278 | A1 | 9/2018 | Cagan et al. |
| 2018/0342157 | A1 | 11/2018 | Donnelly et al. |
| 2018/0348374 | A1 | 12/2018 | Addha et al. |
| 2018/0349746 | A1 | 12/2018 | Vallespi-Gonzalez |
| 2018/0365740 | A1 | 12/2018 | Nix et al. |
| 2018/0370540 | A1 | 12/2018 | Yousuf et al. |
| 2018/0373980 | A1 | 12/2018 | Huval |
| 2019/0016285 | A1 | 1/2019 | Freienstein et al. |
| 2019/0065933 | A1 | 2/2019 | Bogdoll et al. |
| 2019/0066328 | A1 | 2/2019 | Kwant et al. |
| 2019/0071101 | A1 | 3/2019 | Emura et al. |
| 2019/0072966 | A1* | 3/2019 | Zhang ................. G05D 1/0088 |
| 2019/0102646 | A1 | 4/2019 | Redmon et al. |
| 2019/0102668 | A1 | 4/2019 | Yao et al. |
| 2019/0129831 | A1 | 5/2019 | Goldberg |
| 2019/0147600 | A1 | 5/2019 | Karasev et al. |
| 2019/0147610 | A1* | 5/2019 | Frossard ................. G06N 3/045 382/103 |
| 2019/0171912 | A1 | 6/2019 | Vallespi-Gonzalez et al. |
| 2019/0179979 | A1 | 6/2019 | Melick |
| 2019/0204842 | A1* | 7/2019 | Jafari Tafti .......... G05D 1/0221 |
| 2019/0213481 | A1 | 7/2019 | Godaro et al. |
| 2019/0235515 | A1 | 8/2019 | Shirvani et al. |
| 2019/0250622 | A1 | 8/2019 | Nister et al. |
| 2019/0251442 | A1 | 8/2019 | Koivisto et al. |
| 2019/0258251 | A1 | 8/2019 | Ditty et al. |
| 2019/0258878 | A1 | 8/2019 | Koivisto et al. |
| 2019/0272462 | A1* | 9/2019 | Franzius ................. G06F 17/18 |
| 2019/0286153 | A1 | 9/2019 | Rankawat et al. |
| 2019/0310650 | A1* | 10/2019 | Halder .................... G06N 3/084 |
| 2019/0382007 | A1* | 12/2019 | Casas ..................... G06N 3/045 |
| 2019/0384303 | A1 | 12/2019 | Muller et al. |
| 2019/0384304 | A1 | 12/2019 | Towal et al. |
| 2020/0013176 | A1 | 1/2020 | Kang et al. |
| 2020/0143205 | A1 | 5/2020 | Yao et al. |
| 2020/0257301 | A1* | 8/2020 | Weiser ............... G06K 9/00791 |
| 2020/0324795 | A1 | 10/2020 | Bojarski et al. |
| 2020/0339109 | A1 | 10/2020 | Hong et al. |
| 2021/0286923 | A1 | 9/2021 | Kristensen et al. |
| 2021/0406679 | A1 | 12/2021 | Wen et al. |

FOREIGN PATENT DOCUMENTS

| | | | | |
|---|---|---|---|---|
| CN | 106740457 | A | | 5/2017 |
| CN | 106864454 | A1 | | 6/2017 |
| CN | 106873566 | A | | 6/2017 |
| CN | 107031622 | A | | 8/2017 |
| CN | 107065881 | A | | 8/2017 |
| CN | 107121952 | A | * 9/2017 ....... B60R 21/01512 |
| CN | 107450555 | A | | 12/2017 |
| CN | 107491072 | A | | 12/2017 |
| CN | 111373458 | A | * 7/2020 |
| DE | 10 2015 221 920 | A1 | | 5/2017 |
| DE | 10 2015 226 762 | A1 | | 6/2017 |
| EP | 1 930 863 | A2 | | 6/2008 |
| EP | 2 384 009 | A2 | | 11/2011 |
| GB | 2547082 | A | | 8/2017 |
| KR | 2012-0009590 | A | | 2/2012 |
| WO | 2012/011713 | A2 | | 1/2012 |
| WO | 2016/183074 | A1 | | 11/2016 |
| WO | 2018/002910 | A1 | | 1/2018 |
| WO | 2018/102717 | A1 | | 6/2018 |
| WO | 2018/147874 | A1 | | 8/2018 |
| WO | 2018/142394 | A3 | | 10/2018 |
| WO | 2018/218155 | A1 | | 11/2018 |
| WO | 2019199873 | A1 | | 10/2019 |

OTHER PUBLICATIONS

International Search Report and Written Opinion dated Oct. 17, 2019 in International Patent Application No. PCT/US2019/012535, 24 pages.

Non-Final Office Action dated Aug. 7, 2020 in U.S. Appl. No. 16/241,005, 22 pages.

International Preliminary Report on Patentabilty International Patent Application No. PCT/US2019/012535 dated Jul. 7, 2020.

Notice of Allowance dated Feb. 17, 2021 in U.S. Appl. No. 16/241,005, 7 pages.

Pomerleau, D. A. (1989). Alvinn: An autonomous land vehicle in a neural network. In Advances in neural information processing systems (pp. 305-313).

(56) References Cited

OTHER PUBLICATIONS

Muller, U., Ben, J., Cosatto, E., Flepp, B., & Cun, Y. L. (2006). Off-road obstacle avoidance through end-to-end learning. In Advances in neural information processing systems (pp. 739-746).

"Methodology of Using a Single Controller (ECU) For a Fault-Tolerant/Fail-Operational Self-Driving System", U.S. Appl. No. 62/524,283, filed Jun. 23, 2017.

"System and Method for Controlling Autonomous Vehicles", U.S. Appl. No. 62/614,466, filed Jan. 7, 2018.

"System and Method for Safe Operation of Autonomous Vehicles", U.S. Appl. No. 62/625,351, filed Feb. 2, 2018.

"Distance Based Ambient Occlusion Filter for Denoising Ambient Occlusions", U.S. Appl. No. 62/644,601, filed Mar. 19, 2018.

"Adaptive Occlusion Sampling of Rectangular Area Lights with Voxel Cone Tracing", U.S. Appl. No. 62/644,806, filed Mar. 19, 2018.

"System and Methods for Advanced AI-Assisted Vehicles", U.S. Appl. No. 62/648,358, filed Mar. 26, 2018.

"System and Method for Training, Testing, Verifying, and Validating Autonomous and Semi-Autonomous Vehicles", U.S. Appl. No. 62/648,399, filed Mar. 27, 2018.

"Method and System of Remote Operation of a Vehicle Using an Immersive Virtual Reality Environment", U.S. Appl. No. 62/648,493, filed Mar. 27, 2018.

"System and Methods for Virtualized Intrusion Detection and Prevent System in Autonomous Vehicles", U.S. Appl. No. 62/682,803, filed Jun. 8, 2018.

"Deep Learning for Path Detection in Autonomous Vehicles", U.S. Appl. No. 62/684,328, filed Jun. 13, 2018.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

Abdi, L., et al., "Driver information system: a combination of augmented reality, deep learning and vehicular Ad-hoc networks," Multimedia Tools and Applications, Kluwer Academic Publishers, Boston, US, vol. 77, No. 12, pp. 14673-14703 (Aug. 3, 2017).

Asvadi, A., et al., "DepthCN: Vehicle Detection Using 3D-LIDAR and ConvNet", International Conference on Intelligent Transportation Systems (ITSC), IEEE, pp. 1-6 (Oct. 16, 2017).

Aude, E. P. L., et al., "Integration of intelligent systems and sensor fusion within the CONTROLAB AGV", In Mobile Robots XIV, vol. 3838, pp. 50-62 (1999).

Bach, M., et al., "Multi-camera traffic light recognition using a classifying Labeled Multi-Bernoulli filter", IEEE Intelligent Vehicles Symposium (IV), pp. 1045-1051 (Jun. 2017).

Bidlack, C., et al., "Visual Robot Navigation using Flat Earth Obstacle Projection", Proceedings Of The IEEE International Conference On Robotics And Automation, pp. 3374-3381 (1994).

Dynov, I., "Is Deep Learning Really the Solution for Everything in Self-Driving Cars?", Retrieved from Internet URL : https://www.automotive-iq.com/autonomous-drive/articles/deep-learning-really-solution-everything-self-driving-cars, pp. 7 (2017).

Fazlollahtabar, H., et al., "Delay Optimization in a Multiple AGV System", International Journal of Swarm Intelligence and Evolutionary Computation, pp. 7 (2014).

Garnett, N., et al., "Real-Time Category-Based and General Obstacle Detection for Autonomous Driving", IEEE International Conference on Computer Vision Workshops, pp. 198-205 (2017).

Godard, C., et al., "Unsupervised Monocular Depth Estimation with Left-Right Consistency", IEEE Computer Society Conference on Computer Vision and Pattern Recognition, pp. 270-279 (2017).

He, L., et al., "Learning Depth from Single Images with Deep Neural Network Embedding Focal Length", Cornell University Library, pp. 1-14 (Mar. 27, 2018).

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

Jayaraman, A., et al., "Creating 3D Virtual Driving Environments for Simulation-Aided Development of Autonomous Driving and Active Safety", SAE Technical Paper, pp. 1-6 (2017).

Keighobadi, J., et al., "Self-Constructing Neural Network Modeling and Control of an AGV", Positioning, pp. 160-168 (2013).

Kendall, A., et al., "End-to-end Learning of Geometry and Context for Deep Stereo Regression", Cornell University Library, pp. 66-75 (2017).

Kim, W., S., et al., "Depth Map Coding with Distortion Estimation of Rendered View", Proceedings of SPIE, vol. 7543, pp. 75430B1-75430B10, (2010).

Liu, H., et al., "Neural Person Search Machines", IEEE International Conference on Computer Vision (ICCV), pp. 493-501 (2017).

Neven, D., et al., "Towards end-to-end lane detection: an instance segmentation approach", In 2018 IEEE intelligent vehicles symposium (IV), pp. 7 (2018).

Pang, J., et al., "Cascade Residual Learning: A Two-Stage Convolutional Neural Network for Stereo Matching", IEEE International Conference on Computer Vision Workshops, pp. 887-895 (2017).

Reiher, L., et al., "A Sim2Real Deep Learning Approach for the Transformation of Images from Multiple Vehicle-Mounted Cameras to a Semantically Segmented Image in Bird's Eye View," 23rd IEEE International Conference on Intelligent Transportation Systems (ITSC), pp. 6 (May 8, 2020).

Rothe, R., et al., "Non-maximum Suppression for Object Detection by Passing Messages Between Windows", ETH Library, pp. 1-17 (2015).

Schwarting, W., et al., "Planning and decision-making for autonomous vehicles", Annual Review of Control, Robotics, and Autonomous Systems, pp. 26 (2018).

Soylu, M., et al., "A self-organizing neural network approach for the single AGV routing problem", European Journal of Operational Research, pp. 124-137 (2000).

Stein, G. P., et al., "Vision-Based ACC With A Single Camera: Bounds On Range And Range Rate Accuracy", Proceedings Of IEEE Intelligent Vehicle Symposium, pp. 1-6 (2003).

Suorsa, R., E., and Sridhar, B., "A Parallel Implementation of a Multisensor Feature-Based Range-Estimation Method", IEEE Transactions On Robotics And Automation, pp. 1-34 (1993).

Tao, A., "Detectnet: Deep neural network for object detection in digits", NVIDIA Developer Blog, Retrieved from Internet URL: https://devblogs.nvidia.com/detectnet-deep-neural-network-object-detection-digits/, accessed on Jul. 22, 2019, pp. 9 (2016).

Tateno, K., et al., "CNN-SLAM: Real-time dense monocular SLAM with learned depth prediction", Cornell University Library, pp. 6243-6252 (2017).

Tian, Y., et al., "Training and testing object detectors with virtual images," IEEE/CAA Journal of Automatica Sinica, Chinese Association of Automation (CAA), vol. 5, No. 2, pp. 539-546 (Mar. 1, 2018).

Weber, M., et al., "DeepTLR: A single deep convolutional network for detection and classification of traffic lights", IEEE Intelligent Vehicles Symposium (IV), pp. 8 (Jun. 2016).

Zhong, Y., et al., "Self-Supervised Learning for Stereo Matching with Self-Improving Ability", Cornell University Library, pp. 1-13 (2017).

Zitzewitz, G. V., "Survey of neural networks in autonomous driving", Survey of Neural Networks in Autonomous Driving, pp. 1-8 (2017).

International Search Report and Written Opinion received for PCT Patent Application No. PCT/US2019/024400, dated Jun. 26, 2019, 11 pages.

International Preliminary Report on Patentability received in International Application No. PCT/US2019/016418, dated Aug. 13, 2020, 8 pages.

(56) References Cited

OTHER PUBLICATIONS

International Preliminary Report on Patentability received for PCT Application No. PCT/US2019/024400, dated Oct. 8, 2020, 10 pages.
Preinterview First Office Action dated Oct. 13, 2020 in U.S. Appl. No. 16/265,780, 16 pages.
First action without Interview Office Action dated Feb. 1, 2021 in U.S. Appl. No. 16/265,780, 15 pages.
Notice of Allowance dated Mar. 26, 2021 in U.S. Appl. No. 16/265,780, 6 pages.
Corrected Notice of Allowability dated Jun. 8, 2021 in U.S. Appl. No. 16/265,780, 2 pages.
Non-Final Office Action dated Oct. 7, 2021 U.S. Appl. No. 16/366,875, 22 pages.
International Search Report and Written Opinion received from PCT Application No. PCT/US2021/051286 dated Dec. 6, 2021, 17 pages.
Final Office Action dated Feb. 8, 2022 in U.S. Appl. No. 16/366,875, 20 pages.
Ching Y. Hung et al., "Programmable Vision Accelerator", U.S. Appl. No. 62/156,167, filed May 1, 2015.
"Programmable Vision Accelerator", U.S. Appl. No. 15/141,703, filed Apr. 28, 2016.
"Reliability Enhancement Systems and Methods" U.S. Appl. No. 15/338,247, filed Oct. 28, 2016.
Mohammed Abdulla Yousuf et al., "Methodology of Using a Single Controller (ECU) For a Fault-Tolerant/Fail-Operational Self-Driving System", U.S. Appl. No. 62/524,283, filed Jun. 23, 2017.
"Systems and Methods for Safe and Reliable Autonomous Vehicles" U.S. Appl. No. 62/584,549, filed Nov. 10, 2017.
"Detection of Hazardous Autonomous Driving Using Machine Learning," U.S. Appl. No. 62/622,538, filed Jan. 26, 2018.
"Conservative Control for Zone Driving of Autonomous Vehicles Using Safe Time of Arrival", U.S. Appl. No. 62/628,831, filed Feb. 9, 2018.
"System and Method for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for autonomous vehicles", U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Convolutional Neural Networks to Detect Drivable Freespace for Autonomous Vehicles", U.S. Appl. No. 62/643,665, filed Mar. 15, 2018.
"Geometric Shadow Filter for Denoising Ray-Traced Shadows", U.S. Appl. No. 62/644,385, filed Mar. 17, 2018.
"Energy Based Reflection Filter for Denoising Ray-Traced Glossy Reflections", U.S. Appl. No. 62/644,386, filed Mar. 17, 2018.
"Deep Neural Network for Estimating Depth from Stereo Using Semi-Supervised Learning", U.S. Appl. No. 62/646,148, filed Mar. 21, 2018.
"Video Prediction Using Spatially Displaced Convolution", U.S. Appl. No. 62/646,309, filed Mar. 21, 2018.
"Video Prediction Using Spatially Displaced Convolution", U.S. Appl. No. 62/647,545, filed Mar. 23, 2018.
"Network Injection Rate Limiting", U.S. Appl. No. 62/648,326, filed Mar. 26, 2018.
"Network Synchronization Using Posted Operation Tracking For Flush Semantics", U.S. Appl. No. 62/648,333, filed Mar. 26, 2018.

\* cited by examiner

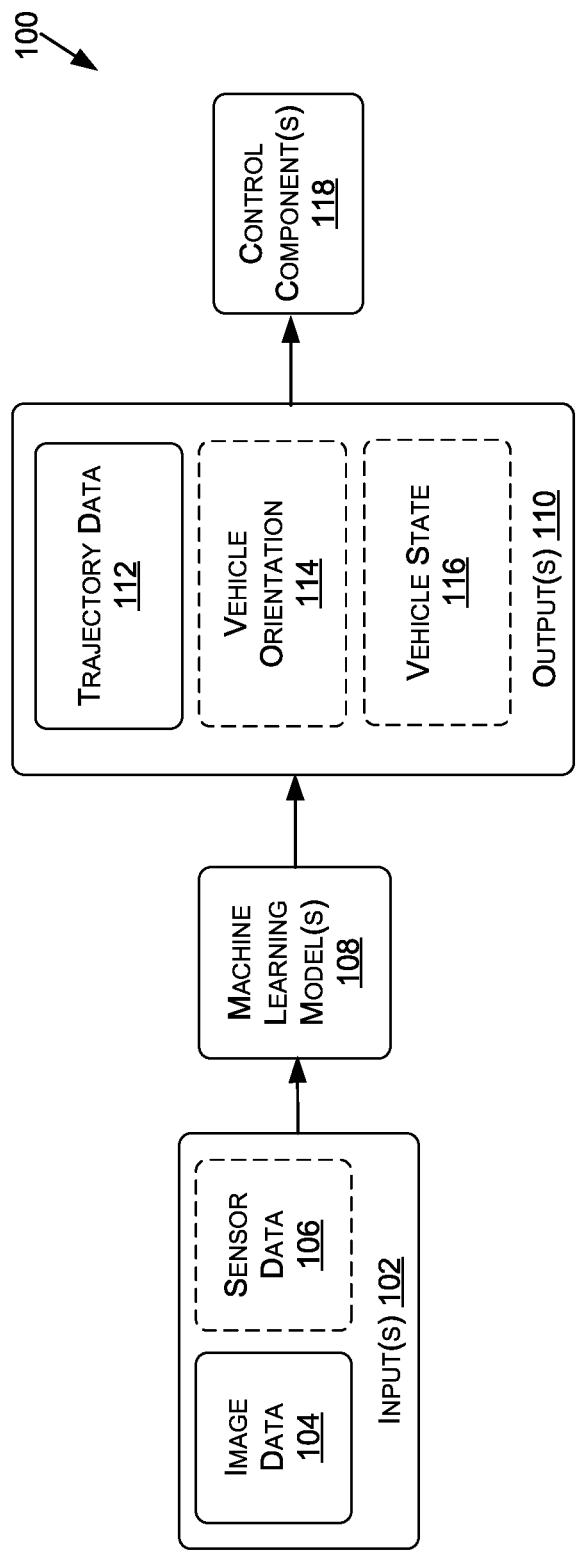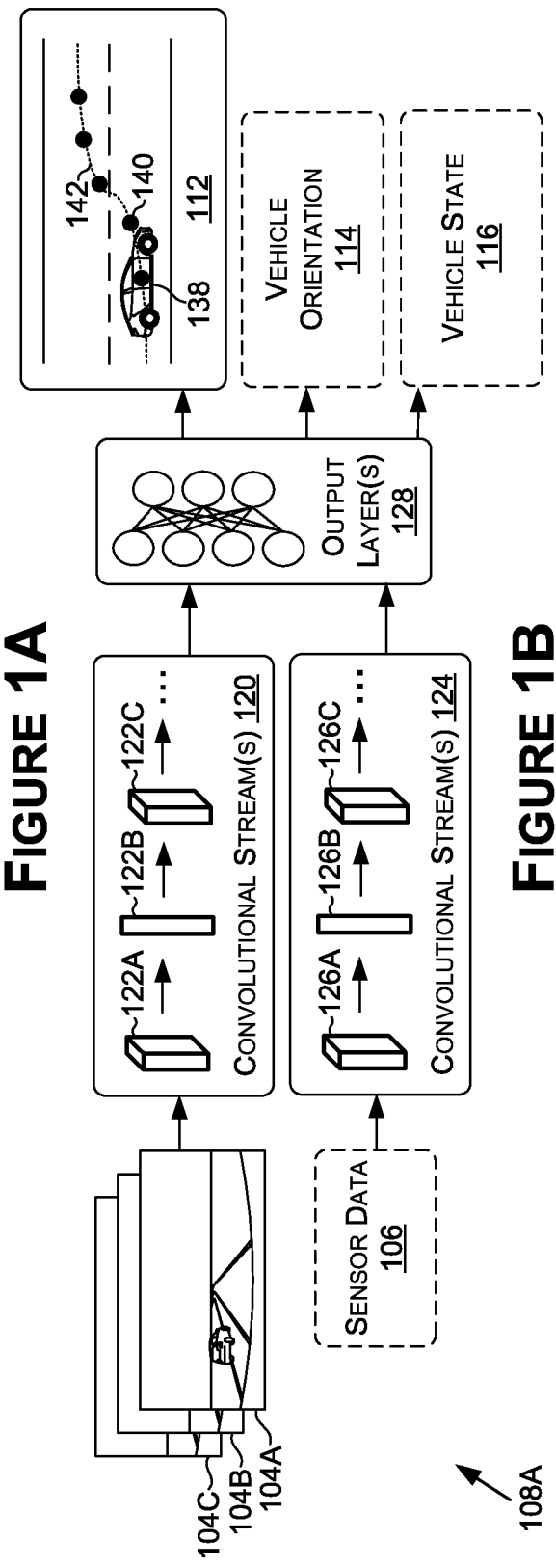

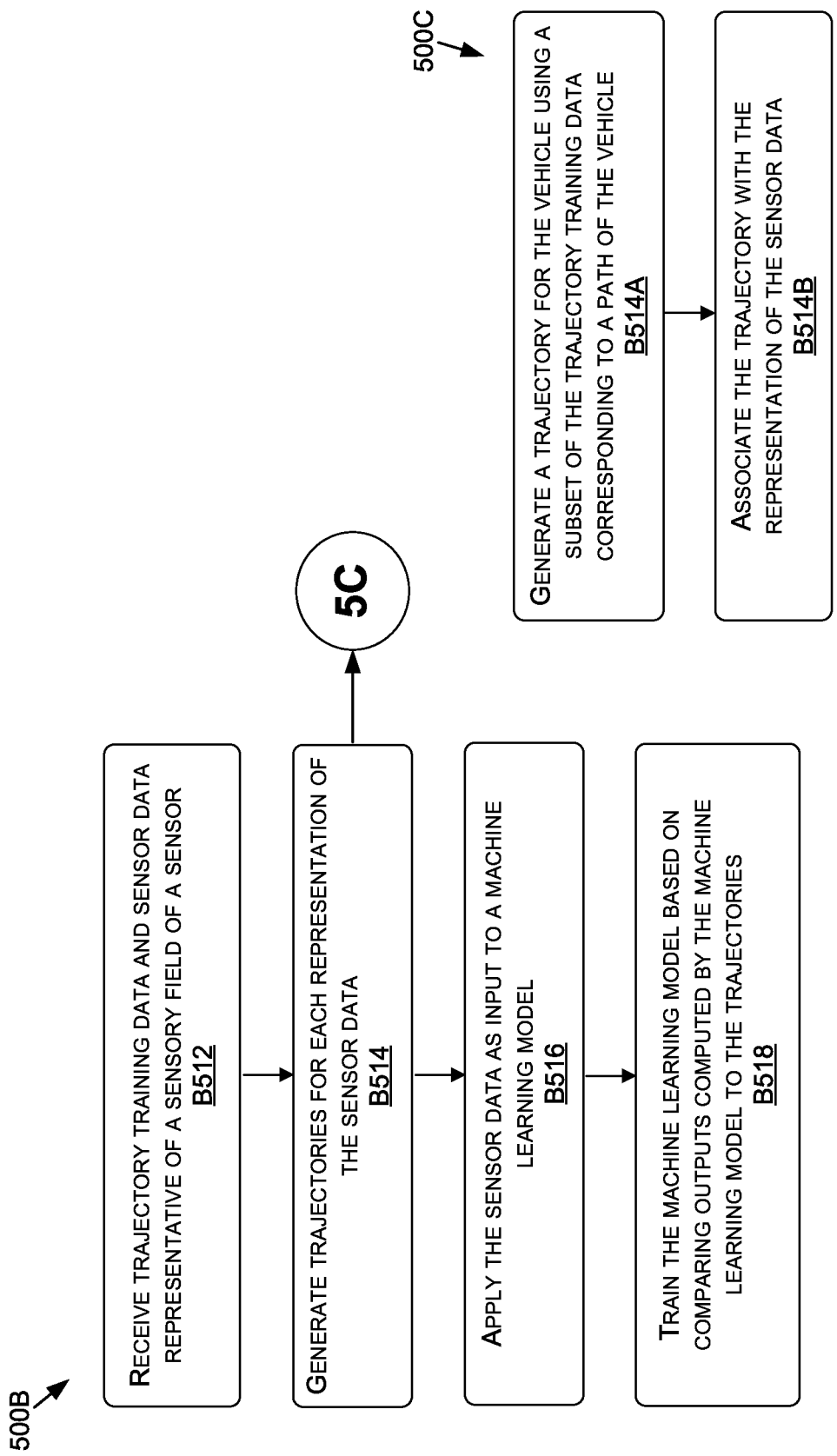

BEHAVIOR-GUIDED PATH PLANNING IN AUTONOMOUS MACHINE APPLICATIONS

CROSS-REFERENCE TO RELATED APPLICATIONS

This application claims the benefit of U.S. Provisional Application No. 62/687,200, filed on Jun. 19, 2018, which is hereby incorporated by reference in its entirety.

This application is related to U.S. Non-Provisional application Ser. No. 16/241,005, filed on Jan. 7, 2019, and hereby incorporated by reference in its entirety.

BACKGROUND

Designing a system to drive a vehicle autonomously without supervision at a level of safety required for practical acceptance is tremendously difficult. An autonomous vehicle should at least be capable of performing as a functional equivalent of an attentive driver, who draws upon a perception and action system that has an incredible ability to identify and react to moving and static obstacles in a complex environment in order to avoid colliding with other objects or structures along its path.

One task of an autonomous system may be determining a recommended path for the autonomous vehicle to follow through the complex environments the vehicle may encounter. For path planning or control, some conventional systems use end-to-end trained deep neural networks (DNNs) that output object dependent commands, such as steering angles, acceleration, deceleration, and/or the like, that can be used by one or more components of an autonomous vehicle. For example, image data may be used by the DNNs to compute outputs that represent steering angles, acceleration, and/or deceleration for the specific vehicle. However, because each vehicle year, make, and/or model may have its own steering profiles, acceleration profiles, and/or deceleration profiles, the scalability and efficacy of these end-to-end trained DNNs is significantly reduced. For example, each vehicle of a first make and model may share the same steering angles that allow for that vehicle to perform safely and operate smoothly, while each vehicle of a different make and model may share steering angles specific to that make and model. As such, a steering angle output for the first make and model may not transfer effectively to the second make and model (e.g., may result in erratic or unsafe vehicle control). As a result, a separately trained DNN may be required for each year, make, and/or model of vehicle, and/or significant post-processing may be required to transform or calibrate outputs from the DNNs to be usable by different vehicle makes and models. However, by training a new DNN for each year, make, and/or model, and/or by executing extensive post-processing, significant computational resources are required both in training of the DNNs as well as in their deployment.

In addition, in some conventional systems, manual labeling or annotating may be required to train the DNNs effectively. However, manual labeling or annotating may require significant time and effort—especially as the systems scale. For example, as a DNN is trained for use in different environments (e.g., new terrain, new geographic locations, new scenarios, etc.) and/or with different vehicle years, makes, and/or models, new ground truth data may need to be created—which requires additional manual labeling—in order to train the DNN to operate in the different environments and/or with the different vehicles. In addition, because the annotations or labels may be made in image space (e.g., to correspond to two-dimensional (2D) pixel coordinates), the outputs of the DNN may require a conversion from image space to world space (e.g., three-dimensional (3D) world coordinates)—thereby increasing computational costs and processing times. Another result of labeling or annotating being manually generated with respect to image space is that the DNNs trained using these labels or annotations are less likely to generate outputs that represent desired or expected paths through environments. For example, a path through image space (e.g., a path through 2D pixel locations of an image) may not correspond to a desired or expected path through 3D world space (e.g., due to difficulty in predicting curves, hills, elevation changes, and/or the like in image space), which may result in the DNNs producing noisy outputs that may lead to more erratic, less smooth control of the vehicle.

SUMMARY

Embodiments of the present disclosure relate to behavior-guided path planning in autonomous machine applications. Systems and methods are disclosed that use observed behaviors—such as driving through a physical environment—to train a machine learning model(s) to predict paths through an environment.

In contrast to conventional systems, such as those described herein, the system of the present disclosure may use automatically generated ground truth data to train a machine learning model—such as a deep neural network (DNN) (e.g., a convolutional neural network (CNN))—to compute trajectory points, a vehicle orientation (e.g., with respect to features of the environment, such as lane markings), and/or a vehicle state (e.g., with respect to an object maneuver, such as a lane change, a turn, a merge, etc.). For example, sensor data that represents orientation, steering information, and/or speed of a vehicle may be collected and used to automatically generate a trajectory for use as ground truth data for training the DNN. By using the sensor data to automatically generate the trajectory as ground truth, the requirement of conventional systems with respect to labeling and annotating new ground truth data for each new environment is eliminated, thereby increasing the scalability of the system of the present disclosure. In addition, during training, the outputs of the DNN may be compared to the trajectory points of the trajectory in world space, which may allow the DNN to intrinsically account for the conversion from 2D pixel coordinates to 2D or 3D world space coordinates without any pre- or post-processing being required to do the same.

In deployment, the output trajectory points from the DNN may be passed to a control component (e.g., a vehicle controller) for controlling the vehicle. For example, the control component may then use the trajectory points to determine a control profile (e.g., steering, braking, and accelerating) specific to the vehicle for controlling the vehicle through the environment based on the trajectory points. As such, in contrast to the actual controls for the vehicle that may be output by DNNs of conventional systems, the trajectory points may allow the system of the present disclosure to be vehicle agnostic—e.g., enabling vehicles of different years, makes, and/or models to use the same output of the same DNN to control the vehicle according to the respective vehicles' configurations and settings.

BRIEF DESCRIPTION OF THE DRAWINGS

The present systems and methods for behavior-guided path planning in autonomous machine applications is described in detail below with reference to the attached drawing figures, wherein:

FIG. 1A is a data flow diagram illustrating an example process for generating path planning information, in accordance with some embodiments of the present disclosure;

FIGS. 1B-1C are illustrations of example machine learning model(s), in accordance with some embodiments of the present disclosure;

FIGS. 5A-5C are flow diagrams showing methods for training a machine learning model(s) to generate path planning information, in accordance with some embodiments of the present disclosure;

DETAILED DESCRIPTION

Figure 1C:
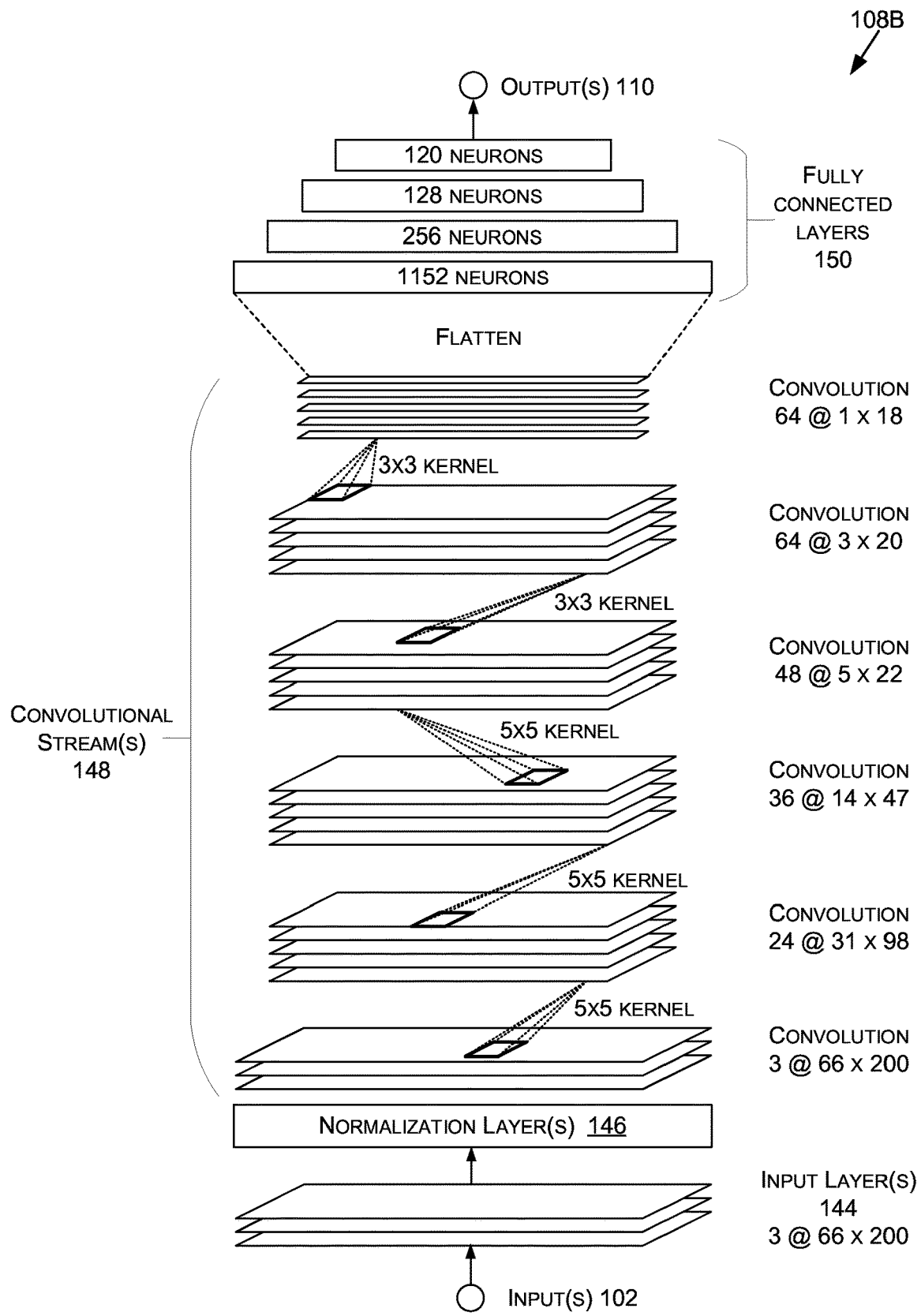

Systems and methods are disclosed related to behavior-guided path planning in autonomous machine applications. More specifically, the present disclosure relates to path planning for autonomous vehicles using behavior observation as represented by sensor data generated by sensors of the autonomous vehicles. Although the present disclosure may be described with respect to an example autonomous vehicle 138 (alternatively referred to herein as "vehicle 138" or "autonomous vehicle 138," an example of which is described herein with respect to FIGS. 6A-6D, this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., path planning for a robot), aerial systems (e.g., path planning for a drone or other aerial vehicle), nautical systems (e.g., path planning for a boat or other water vessel), and/or other technology areas, such as for localization, path planning, and/or other processes.

Trajectory Generation System

Path planning may be used to aid in navigation through environments by autonomous machines controlled by autonomous systems (e.g., an autonomous driving software stack). In embodiments of the present disclosure, and to help determine a path for the autonomous vehicles, a deep neural network (DNN)—e.g., a convolutional neural network (CNN)—may be used to generate one or more trajectory points that correspond to a predicted or recommended trajectory for the autonomous vehicle. The output trajectory point(s) may be generated at defined increments of distance—such as 1 meter increments, 2 meter increments, etc.—and then passed to a control component (e.g., a vehicle controller) for controlling the autonomous vehicle. In some examples, the increments may increase the farther from the vehicle the trajectory point is to account for potential diminishing accuracy of the DNN at farther distances. The control component may then use the trajectory point(s) to determine a control profile and/or series of operations (e.g., steering, braking, and accelerating) to control the vehicle through the trajectory point(s). Generating the trajectory point(s) allows the system to be operated safely and autonomously without dependencies on vehicle type (e.g., year, make, and/or model), and may enable the control component—that may differ for each vehicle year, make, and/or model—to use the trajectory point(s) to control the vehicle according to the respective vehicles' own configurations and settings.

In some examples, image data used to train the DNN, as well as image data used by the DNN during deployment, may be captured by cameras having different perspectives (e.g., locations and orientations with respect to a specific vehicle, ground plane, or other point of reference). In such examples, the image data may be transformed—to generate transformed image data—by shifting and/or rotating the images represented by the image data to a perspective of a reference or ideal camera. As such, the DNN may be trained on image data that is from a same, transformed perspective. In such examples, when the DNN is deployed, another transformation may be applied to the image data from the vehicle in deployment to transform the image data from the perspective of the camera of the vehicle to the perspective of the reference or ideal camera. As a result, the DNN may be trained and deployed—across any number of different vehicles with cameras having different perspectives—using image data that is of the same perspective as the reference or ideal camera. This process increases the scalability of the system while removing vehicle specific dependencies to generate a machine learning model that is deployable in any number of different vehicles.

In some embodiments, the trajectory points may be output as three-dimensional (3D) world space coordinates. By adding a third dimension (e.g., the Z, or height, dimension) to the trajectory points, the trajectory generated by the machine learning model may be more accurate and thus more effective in path planning for the vehicle. For example, where only two-dimensional (2D) points are used, the path around a lateral curve or turn that also includes a vertical curve (e.g., a hill) may be different than the same lateral curve or turn on a flat surface. This may result in less accurate trajectory points from the machine learning model (e.g., the path through the curve may be offset to the left or right, closer to the lane markings or boundary than center-of-the-lane driving). However, by training the machine learning model using three dimensions, the machine learning model may learn to account for these vertical curves and thus may produce a consistent output of trajectory points for the vertically curved and the flat surface (e.g., because the turn may be substantially the same, while only the elevation may change).

Now referring to FIG. 1, FIG. 1A is a data flow diagram illustrating an example process 100 for generating path planning information, in accordance with some embodiments of the present disclosure. At a high level, the process 100 may include one or more machine learning models 108 receiving one or more inputs 102 and generating one or more outputs 110. The input(s) 102 may include image data, such as image data generated by one or more cameras of an autonomous vehicle (e.g., vehicle 138, as described herein), in addition to, in some embodiments, sensor data 106 (e.g., LIDAR data from one or more LIDAR sensors, RADAR data from one or more RADAR sensors, audio data from one or more microphones, SONAR data from one or more SONAR sensors, etc.). The machine learning model(s) 108 may be trained to generate trajectory data 112 (e.g., one or more trajectory points in 2D or 3D world space), a vehicle orientation 114 (e.g., with respect to one or more features of the environment, such as lane markings, a lane, a road boundary, etc.), and/or a vehicle state 116 (e.g., with respect to a vehicle maneuver, such as a lane change, a turn, a lane split, etc.). These output(s) 110 may be used by control component(s) 118 of an autonomous vehicle (e.g., controller(s) 636, ADAS system 638, SOC(s) 604, and/or other components of the autonomous vehicle 138) to aid the vehicle in navigating (e.g., path planning) an environment.

The input(s) 102 may include the image data 104, the sensor data 106, and/or other data types (e.g., map data). The image data 104 may include data representative of images of a field of view of one or more cameras of the vehicle, such as stereo camera(s) 868, wide-view camera(s) 870 (e.g., fisheye cameras), infrared camera(s) 872, surround camera(s) 874 (e.g., 360 degree cameras), long-range and/or mid-range camera(s) 898, and/or other camera type of the vehicle 138. In some examples, the image data 104 may be captured by a single camera with a forward-facing, substantially centered field of view with respect to a horizontal axis (e.g., left to right) of the vehicle 138. In a non-limiting embodiment, one or more forward-facing cameras may be used (e.g., a center or near-center mounted camera(s)), such as a wide-view camera 670, a surround camera 674, a stereo camera 668, and/or a long-range or mid-range camera 698. The image data 104 captured from this perspective may be useful for computer vision and/or perception when navigating—e.g., within a lane, through a lane change, through a turn, through an intersection, etc.—because a forward-facing camera may include a field of view (e.g., the field of view of the forward-facing stereo camera 668 and/or the wide-view camera 670 of FIG. 6B) that includes both a current lane of travel of the vehicle 138, adjacent lane(s) of travel of the vehicle 138, and/or boundaries of the driving surface. In some examples, more than one camera or other sensor (e.g., LIDAR sensor, RADAR sensor, etc.) may be used to incorporate multiple fields of view (e.g., the fields of view of the long-range cameras 698, the forward-facing stereo camera 668, and/or the forward facing wide-view camera 670 of FIG. 6B).

In some examples, the image data 104 may be captured in one format (e.g., RCCB, RCCC, RBGC, etc.), and then converted (e.g., during pre-processing of the image data 104) to another format. In some other examples, the image data 104 may be provided as input to a sensor data pre-processor (not shown) to generate pre-processed image data (also referred to as image data 104, herein). Many types of images or formats may be used as inputs, for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. It is noted that different formats and/or resolutions could be used training the machine learning model(s) 108 than for inferencing (e.g., during deployment of the machine learning model(s) 108 in the autonomous vehicle 138).

The sensor data pre-processor may use image data representative of one or more images (or other data representations) and load the sensor data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the machine learning model(s) 108.

In some embodiments, a pre-processing image pipeline may be employed by the sensor data pre-processor to process a raw image(s) acquired by a sensor(s) (e.g., camera(s)) and included in the image data 104 to produce pre-processed image data which may represent an input image(s) to the input layer(s) (e.g., convolutional streams(s) 120 of FIG. 1B) of the machine learning model(s) 108. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

In some examples, the sensor data 106 may include the sensor data generated by any number of sensors, such as LIDAR sensor(s) 664, RADAR sensor(s) 660, ultrasonic sensor(s) 662, microphone(s) 696, and/or other sensor types. The sensor data 106 may represent fields of view and/or sensory fields of sensors (e.g., LIDAR sensor(s) 664, RADAR sensor(s) 660, etc.), and/or may represent a perception of the environment to one or more sensors (e.g., a microphone(s) 696). Sensors such as image sensors (e.g., of cameras), LIDAR sensors, RADAR sensors, SONAR sensors, ultrasound sensors, and/or the like may be referred to herein as perception sensors or perception sensor devices, and the sensor data generated by the perception sensors may be referred to herein as perception sensor data. In some examples, an instance or representation of the sensor data 106 may be represented by an image captured by an image sensor, a depth map generated by a LIDAR sensor, and/or the like. LIDAR data, SONAR data, RADAR data, and/or other sensor data types may be correlated with, or associated with, image data generated by one or more image sensors. For examples, image data representing one or more images may be updated to include data related to LIDAR sensors, SONAR sensors, RADAR sensors, and/or the like, such that the sensor data used for training and/or input to a DNN may be more informative or detailed than image data alone. As such, the DNN may learn to generate trajectories in 3D or 2D world space using this additional information from any number of perception sensors.

In embodiments where the sensor data 106 is used, the sensors may be calibrated such that the sensor data 106 is associated with pixel coordinates in the image data 104. The sensor data pre-processor may further perform pre-processing on the sensor data 106, which may be similar to that of the pre-processing described herein with respect to the image data 104. In some embodiments, such as where the sensor data 106 is indicative of depth (e.g., RADAR data, LIDAR data, etc.), the depth values may be correlated with the pixel coordinates in the image data 104, and then used as an additional (or alternative, in some examples) input 102 to the machine learning model(s) 108. For example, one or more of the pixels may have an additional value associated with it that is representative of depth, as determined from the sensor data 106.

In some examples, the image data 104 and/or the sensor data 106 may be transformed, calibrated, and/or augmented to a reference or ideal camera and/or sensor, respectively. For example, to increase scalability of the system, as well as remove vehicle type dependencies, the machine learning model(s) 108 may be trained on and deployed to use image data 104 and/or sensor data 106 that is from a perspective (e.g., location—left to right and up and down—and/or rotation) of any of a same, reference, or ideal camera and/or sensor. As such, camera parameters (e.g., intrinsic and/or extrinsic) may be used to determine the perspective of the camera(s) that captured training image data, and the training image data may be transformed, or augmented, to a perspective of the reference or ideal camera (e.g., a camera centered, from left to right, on the vehicle and installed at a location, such as a bumper, or front of the vehicle). In deployment, camera parameters may be used to determine the perspective of the camera(s) that capture the image data 104, and the image data 104 may be transformed, or augmented, to the perspective of the reference or ideal camera. As a result, the machine learning model(s) 108 are trained on and deployed using image data from substantially the same perspective. Similarly, for sensors, the sensor parameters may be used to transform or augment the training sensor data and the sensor data 106 to a perspective of a reference or ideal sensor. The transformation and/or augmentation of the image data 104 and/or the sensor data 106 is described in more detail herein at least with respect to FIGS. 2A and 3.

In some embodiments, the inputs 102 may include other data types, such as map data. The map data may be used by the machine learning model(s) 108 to generate the outputs 110, such as the vehicle state 116 and/or the trajectory 112. For example, the map data may include low-resolution map data (e.g., screenshots of a 2D map application with or without guidance). This low-resolution map data may include a basic geometry of the road and/or intersections, such as without additional information such as lane markings, number of lanes, locations of sidewalks, street lights, stop signs, etc. In other words, in contrast with the map data representing an HD map (e.g., the HD map 622 and/or the HD maps described herein and relied upon by conventional systems), the map data may be less data intense, and used only as an additional data point by the machine learning model(s) 108 when computing the outputs 110.

The map data, in some examples, may include a screenshot or an image (or data representative thereof) that depicts a current lane of the vehicle, a destination lane of the vehicle, the vehicle itself, and/or a representation of the path for the vehicle to take through the lane change. In some examples, the path of the vehicle used for the map data for training may be automatically generated during human-piloted portions of vehicle operation (e.g., as the vehicle is controlled through the environment, the path is populated over the map).

In examples, the map data may include commands, such as "at the next intersection, turn right," or the like, and the machine learning model(s) 108 may use this information to generate the trajectory data 112 and/or the vehicle state 116 corresponding to staying in a current lane, or switching lanes to get to a right-most lane, and then turning right at the next intersection. Similarly, for a lane split, the command may be representative of staying to the left at the lane split, and the machine learning model(s) may use this information to generate the trajectory data 112 and/or the vehicle state 116 as the vehicle is maneuvered to the left during the lane split. In any example, the map data may be generated automatically (e.g., during piloting of the car by a human) and/or may be generated by manual labeling.

In some examples, the map data may be similar to and/or may be used (e.g., for training and/or inference) similarly to the map information described in U.S. Non-Provisional application Ser. No. 16/241,005, filed on Jan. 7, 2019, and hereby incorporated by reference in its entirety.

The machine learning model(s) 108 may use as input one or more images or other data representations or instances (e.g., LIDAR data, RADAR data, SONAR data, ultrasound data, etc.) as represented by the sensor data 106 to generate the output(s) 110. In a non-limiting example, the machine learning model(s) 108 may take as input an image(s) represented by the sensor data 106 (e.g., after pre-processing to generate the trajectory data 112, the vehicle orientation 114, and/or the vehicle state 116). Although examples are described herein with respect to using neural networks, and specifically convolutional neural networks, as the machine learning model(s) 108 (e.g., with respect to FIGS. 1B and 1C), this is not intended to be limiting. For example, and without limitation, the machine learning model(s) 108 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The output(s) 110 may include the trajectory data 112, the vehicle orientation 114, and/or the vehicle state 116. The trajectory data 112 may include one or more trajectory points representative of 2D or 3D world space coordinates (e.g., coordinates in the physical environment, as opposed to pixel coordinates from conventional approaches). For example, each row of the trajectory data 112 may be output as a two cell array (e.g., a first cell for an x position and a second cell for a y position) for each trajectory point in embodiments where 2D coordinates are generated, and may be output as a three cell array (e.g., a first cell for an x position, a second cell for a y position, and a third cell for a z position for each trajectory point in the embodiments where 3D coordinates are generated. Any number of trajectory points may be generated for each trajectory, depending on the embodiment. For example, a single trajectory point may be generated in some examples, while in other examples, forty to sixty trajectory points may be generated. This is not intended to be limiting, and the machine learning model(s) 108 may be trained to generate any number of trajectory points without departing from the scope of the present disclosure. The trajectory data 112 output by the machine learning model(s) 108 may include a number of rows that corresponds to the number of trajectory points the machine learning model(s) is trained to compute. As a non-limiting example, where the machine learning model(s) 108 is trained to generate forty trajectory points in 3D world coordinates, the trajectory data 112 (for each iteration of input(s) 102) may include a 3×40 output array.

The positions represented by the 2D or 3D coordinates may represent a location where an origin point (e.g., a 2D or 3D location on the vehicle) of the vehicle (e.g., the vehicle 138) should navigate toward (e.g., such that the origin point of the vehicle comes into substantial alignment, or overlap, with the 2D or 3D coordinate). The origin point (e.g., [0, 0] for 2D and [0, 0, 0] for 3D) of the vehicle may be any point depending on the specific embodiment (e.g., based on the origin point used to generate the training trajectory data for the machine learning model(s) 108). For example, the origin point may be at a lateral center of an axle of the vehicle (e.g., a rear axle, a front axle, a middle axle in vehicles with more than two axles, etc.), at a longitudinal center of the vehicle, at a vertical center of the vehicle, at a front of the vehicle, at a rear of the vehicle, at a side of the vehicle, at another location on the vehicle, and/or a combination thereof.

As a non-limiting example, suppose that a first trajectory point (e.g., [x, y, z], expressed in feet, positive values meaning forward, right, or up, and negative values meaning backward, left, or down) is at [1.4, −0.7, 0], the origin point of the vehicle may be controlled toward the point that is 1.4 feet forward, 0.7 feet to the left, and 0 feet in the vertical, or z, direction (e.g., flat ground). Each successive trajectory point may include values that correspond to the origin for the particular trajectory (e.g., if a second trajectory point was at [3.1, −0.9, 0], this would be with respect to the origin, or at the starting position of the vehicle's path), or each successive trajectory point may correspond to a difference from a prior (e.g., immediately preceding) trajectory point (e.g., such that the prior trajectory point is zeroed out, and the next trajectory point is relative to the prior, zeroed out trajectory point). The trajectory points may be expressed in polar coordinates, Cartesian coordinates, and/or another form. Although discussed as being expressed in feet or meters herein, this is not intended to be limiting. For example, the measurements associated with the trajectory points may be in any unit, such as SI, metric, or US, to name a few. For example, millimeters, centimeters, inches, feet, meters, and/or any other units of measurement may be used depending on the embodiment, and without departing from the scope of the present disclosure.

The trajectory points may be computed at increments in world space (e.g., in an x, or forward, direction), such as one meter, two meters, three meters, ten meters, and so on. For example, the increment size may be determined, or optimized, during training to generate trajectory points that are effective for the vehicle (e.g., that lead to safe, smooth control of the vehicle) while not requiring the computation of so many trajectory points that processing speeds are reduced below real-time operation or unnecessary computational resources are used. As such, and without limitation, an increment size of one to two meters has provided accurate, usable results during testing that allow the process 100 to perform in real-time, without hindering real-time operation of any of the many other processes being executed by the vehicle simultaneously (e.g., processes performed by any number of layers of an autonomous driving software stack, such as a planning layer, a control layer, an actuation layer, an obstacle avoidance layer, etc.).

The increment size, in combination with the number of trajectory points to be computed, may determine the distance from the vehicle (or from the origin of the vehicle's path) that the trajectory extends into world space. For example, in a non-limiting example where the increment size is one meter and fifty trajectory points are computed, the predicted or recommended trajectory computed by the machine learning model(s) 108 may extend fifty meters. The length of the desired trajectory may be a factor used in determining the increment size and/or the number of trajectory points to be computed by the machine learning model(s) 108. As such, the length of the trajectory may be, without limitation, one meter, two meters, twenty meters, forty meters, sixty meters, one-hundred eighty meters, and so on, without departing from the scope of the present disclosure.

In some examples, because the accuracy of the predicted trajectory points may be reduced the farther the predicted trajectory points are from the vehicle (or from the origin point of the vehicle), the increment size may be increased at farther distances. For a non-limiting example, the increment size may be a first size for a first trajectory point, a second size for a later trajectory point, a third size for a later trajectory point, a fourth size for a later trajectory point, and so on, where the size increases from first to fourth. The change in size may be gradual (e.g., may increase steadily, such as by x amount every trajectory point, may increase at intervals, such as at every x number of trajectory points, etc.), or may be more clearly delineated (e.g., first half of trajectory points have a first increment size, second half of trajectory points have a second increment size greater than the first, etc.).

In some examples, without departing from the scope of the present disclosure, the trajectory data 112 may include a parametrized representation of the path, such as the parameters of a polygon approximation of the path.

In some example embodiments, the vehicle (e.g., the vehicle 138) may include a localization system (e.g., using an HD map 622, GNSS sensor(s) 658, component(s) of a perception layer of an autonomous driving software stack, etc.) that enables calculation of a geographic location with a high level of accuracy (e.g., where GNSS alone may be accurate only up to thirty meters, localization systems may be accurate within a centimeter or less). In such embodiments, the localization information may be tied to the origin point of the vehicle, and the trajectory points may be converted to GNSS coordinates prior to, or after, being used by the control component(s) 118. For example, the GNSS coordinates may be used by the control component(s) 118 to navigate the vehicle to the GNSS coordinates and/or the GNSS coordinates may be used by one or more other components of the vehicle and/or the autonomous driving software stack (e.g., component(s) of a planning layer, a control layer, a perception layer, and/or another layer of the stack).

Another output 110, the vehicle orientation 114, may represent an orientation of the vehicle with respect to a lane, a road boundary, another vehicle, etc., depending on the embodiment. For example, the machine learning model(s) 108 may be trained to output an orientation with respect to a lane, such as within the lane, outside of the lane, between lanes, at an angle (e.g., a specific angle, such as a degree, or a value that represents a degree) with respect to the lane markings, etc. The vehicle orientation 114 may help inform the control component(s) 118 as to the current orientation of the vehicle to help in determining how to control the vehicle to traverse the trajectory points.

Another output 110 may be the vehicle state 116. As described herein, the vehicle state 116 may be a state with respect to a vehicle maneuver, such as a turn, a lane change, a lane split, a lane merge, and/or another vehicle maneuver. In such examples, the inputs 102, outputs 110, and/or training process for the machine learning model(s) 108, may be similar, at least in part, to the disclosure of U.S. Non-Provisional application Ser. No. 16/241,005, filed on Jan. 7, 2019, and hereby incorporated by reference in its entirety, may be used. The vehicle state 116 may inform the control component(s) 118 as to how to control the vehicle, such as to prepare to reenter a lane keeping mode after a lane change mode.

In some examples, the machine learning model(s) 108 may be trained to output a validity score for some or all of the trajectory points. In such examples, a confidence score may be generated by the machine learning model(s) 108 that is indicative of a likelihood of the trajectory point(s) being accurate. Where a trajectory point is out of the field of view of a camera, for example, the confidence score may be low, and the trajectory point may be marked as invalid. A threshold confidence score may be used for determining whether a trajectory point is valid or invalid. When invalid, the trajectory point may be discarded, or ignored, and a trajectory point from a next, or prior, iteration of the machine learning model(s) 108 may be used instead, or the trajectory point may be skipped over for a next trajectory point of the same trajectory from the current iteration.

The control component(s) 118 may use the outputs of the machine learning model(s) 108 to perform one or more operations. The one or more operations may include controlling the vehicle toward or through the trajectory points represented by the trajectory data 112 (and may use the vehicle orientation 114 and/or the vehicle state 116 for context in some embodiments). Because the machine learning model(s) 108 may be end-to-end systems—meaning that the input data is received as an input and the output is directly usable by the vehicle—the control component(s) 118 may receive and/or use the output(s) 110 without requiring any post-processing. By reducing the amount of post-processing to zero, the process 100 may be executed efficiently, accurately, and in real-time, without an unnecessary drain on computing resources (in contrast to conventional systems, as described herein).

In some examples, however, post-processing may be performed, such as temporal smoothing, spatial smoothing, GNNS conversion of the trajectory data 112 (e.g., as described herein), and/or other post-processing. For example, the trajectory data 112 from a current iteration of the machine learning model(s) 108 may use temporal smoothing to weight the trajectory data 112 against the trajectory data 112 from any, or all, prior iterations. As another example, some of the trajectory data 112 from a current iteration may be weighed against other trajectory data 112 from the current iteration to perform spatial smoothing. In such an example, where a threshold difference in any direction (e.g., x, y, or z) between two or more points (e.g., consecutive points) is determined, a computation may be executed to adjust the values (e.g., by averaging, using standard deviation, etc.). A result of spatial smoothing and/or temporal smoothing may be less noisy, more fluid or smooth outputs 110.

Now referring to FIG. 1B, FIG. 1B is an illustration of an example machine learning model(s) 108A, in accordance with some embodiments of the present disclosure. The machine learning model(s) 108A of FIG. 1B may be one example of a machine learning model(s) 108 that may be used in the process 100. However, the machine learning model(s) 108A of FIG. 1B is not intended to be limiting, and the machine learning model(s) 108 may include additional and/or different machine learning models than the machine learning model(s) 108A of FIG. 1B. The machine learning model(s) 108A may include or be referred to as a convolutional neural network (CNN) and thus may alternatively be referred to herein as convolutional neural network 108A, convolutional network 108A, or CNN 108A.

The CNN 108A may use the image data 104 and/or the sensor data 106 (with or without any pre-processing) as an input. For example, the CNN 108A may use the image data 104—as represented by images 104A, 104B, and 104C—as an input. The image data 104 may represent images generated by one or more cameras (e.g., one or more of the cameras described herein with respect to FIGS. 6A-6C). For example, the image data 104 may be representative of a field of view of the camera(s). More specifically, the image data 104 may be representative of individual images generated by the camera(s), and the image data 104 representative of one or more of the individual images may be input into the CNN 108A at each iteration of the CNN 108A. In addition to the image data 104, in some embodiments, the sensor data 106 may be input to the CNN 108A in addition to or alternatively from, the image data 104. The sensor data 106 may be representative of perspectives of a physical environment as observed by one or more sensors—such as a LIDAR sensor(s), a RADAR sensor(s), a microphone(s), a SONAR sensor(s), etc.

The image data 104 may be input into a convolutional layer(s) 122 of the CNN 108A (e.g., convolutional layer 122A). The convolutional stream 120 may include any number of layers 122, such as the layers 122A-122C. The sensor data 106 may be input into a convolutional layer(s) 126 of the CNN 108A (e.g., convolutional layer 126A). The convolutional stream 124 may include any number of layers 126, such as the layers 126A-126C. In some examples, image data 104 and/or sensor data from each different camera and/or each different sensor, respectively, may be associated with its own convolutional stream (e.g., image data 104 from a first camera has a first convolutional stream, image data 104 from a second camera has a second convolutional stream, sensor data 106 from a first sensor has a third convolutional stream, and so on). However, in some examples, some sensor data 106 and/or image data 104 may not be associated with any convolutional layers. In such examples, one or more other layers types may be used for at least some of the sensor data 106 and/or image data 104 without departing from the scope of the present disclosure.

One or more of the layers 122, 126 may include an input layer. The input layer(s) may hold values associated with the image data 104, and/or the sensor data 106. For example, with respect to the image data 104, the input layer(s) may hold values representative of the raw pixel values of the image(s) as a volume (e.g., a width, W, a height, H, and color channels, C (e.g., RGB), such as 32×32×3), and/or a batch size, B.

One or more layers 122, 126 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 122, 126 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 122, 126 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the CNN 108A may not include any pooling layers. In such examples, strided convolution layers may be used in place of pooling layers.

One or more of the layers 122, 126 may include a fully connected layer. Each neuron in the fully connected layer(s) may be connected to each of the neurons in the previous volume. The fully connected layer may compute class scores, and the resulting volume may be 1×1×number of classes. In some examples, the convolutional stream(s) 120, 124 may include a fully connected layer, while in other examples, the fully connected layer of the CNN 108A may be the fully connected layer separate from the convolutional streams(s) 120, 124 (e.g., the fully connected layer(s) may be part of the output layer(s) 128, as illustrated in FIG. 1C).

Although input layers, convolutional layers, pooling layers, ReLU layers, and fully connected layers are discussed herein with respect to the convolutional layer(s) 122, 126, this is not intended to be limiting. For example, additional or alternative layers 122, 126 may be used in the convolutional stream(s) 120, 124, such as normalization layers, SoftMax layers, and/or other layer types.

Different orders and numbers of the layers 122, 126 of the CNN 108A may be used depending on the embodiment. For example, for a first vehicle, there may be a first order and number of layers 122, 126, whereas there may be a different order and number of layers 122, 126 for a second vehicle; for a first camera, there may be a different order and number of layers 122, 126 than the order and number of layers for a second camera. In other words, the order and number of layers 122, 126 of the CNN 108A, the convolutional streams 120, 124, and/or the output layer(s) 128 is not limited to any one architecture.

In addition, some of the layers 122, 126 may include parameters (e.g., weights and/or biases), such as the layers of the convolutional streams 120, 124 and/or the output layer(s) 128, while others may not, such as the ReLU layers and pooling layers, for example. In some examples, the parameters may be learned by the convolutional streams 120, 124 and/or the machine learning model(s) 108A during training. Further, some of the layers 122, 126 may include additional hyper-parameters (e.g., learning rate, stride, epochs, kernel size, number of filters, type of pooling for pooling layers, etc.), such as the convolutional layers 122, 126, the output layer(s) 128, and the pooling layers (as part of the convolutional stream(s) 120, 124), while other layers may not, such as the ReLU layers. Various activation functions may be used, including but not limited to, ReLU, leaky ReLU, sigmoid, hyperbolic tangent (tanh), exponential linear unit (ELU), etc. The parameters, hyper-parameters, and/or activation functions are not to be limited and may differ depending on the embodiment.

The output of the convolutional stream(s) 120, 124 may be input to output layer(s) 128 (which may be fully connected layer(s), in some examples) of the CNN 108A. In addition to the output of the convolutional stream(s) 120, 124, in examples where vehicle orientation 114 and/or vehicle state 116 are used, outputs of one or more layers trained to calculate the vehicle orientation 114 and/or the vehicle state 116 may be provided as inputs to the output layer(s) 128 (e.g., fully connected layer(s), as described herein).

The outputs 110 of the CNN 108A may include the trajectory data 112, the vehicle orientation 114, the vehicle state 116, and/or other output types. The trajectory data 112 may be representative of a recommended trajectory 142. However, in some examples, the output 110 may include control data for following the recommended trajectory 142 (e.g., for controlling the vehicle 138 according to the recommended trajectory 142, such as steering angle, acceleration, deceleration, etc.). The trajectory data 112 may include, in some examples, a trajectory point(s) 140 (e.g., as represented by 2D or 3D coordinates in world space, and/or 2D coordinates in image space) along the recommended vehicle trajectory 142. In some examples, only a single trajectory point 140 (e.g., the next trajectory point for the vehicle 138 in the sequence of discretized trajectory steps) may be output by the machine learning model(s) 108A. In other examples, more than one trajectory point 140 may be output. As another example, an entire trajectory may be output, which may be extrapolated from two or more trajectory points 140. In some examples, the recommended trajectory 142 may be output as a radius of the recommended vehicle trajectory 142, or may be output as an inverse radius of the recommended trajectory 142 (e.g., where a turn, a lane change, a lane split, a lane marge, and/or a curve is included in the recommended trajectory 142). The recommended trajectory 142 and/or the trajectory point(s) 140 thereon, may be used by the control component(s) 118 to control the vehicle 138 through a physical environment.

Now referring to FIG. 1C, FIG. 1C is an illustration of another example machine learning model(s) 108B, in accordance with some embodiments of the present disclosure. The machine learning model(s) 108B of FIG. 1C may be one example of a machine learning model(s) 108 that may be used in the process 100. However, the machine learning model(s) 108B of FIG. 1C is not intended to be limiting, and the machine learning model(s) 108 may include additional and/or different machine learning models than the machine learning model(s) 108B of FIG. 1C. The machine learning model(s) 108B may include or be referred to as a convolutional neural network (CNN) and thus may alternatively be referred to herein as convolutional neural network 108B, convolutional network 108B, or CNN 108B.

The CNN 108B may receive one or more inputs 102, which may include the image data 104 and/or the sensor data 106 from one or more sensor types. The input(s) 102 may be applied to one or more input layer(s) 144. In a non-limiting example, there may be three input layer(s) 144, and the layer(s) may receive YUV, RGB, JPEG, and/or other formats of image data 104 at the input layer(s) 144. Without limitation, the input layer(s) 144 may have a spatial resolution of 66×200, or may have a smaller, or larger spatial resolution, depending on the embodiment.

The CNN 108B may include one or more normalization layers 146. The normalization layers may represent one or more normalization functions, such as batch normalization, local contrast normalization, simplified whitening layers, local response normalization, and/or another normalization function.

The CNN 108B may include a convolutional stream(s) 148 that includes a plurality of different layers, such as those described herein with respect to the CNN 108A of FIG. 1B. In a non-limiting example, the convolutional stream(s) 148 may include a plurality of convolutional layers that reduce the spatial resolution throughout the convolutional stream(s) 148. For example, and without limitation, as illustrated in FIG. 1C, the convolutional layers may reduce the spatial resolution from 66×200, to 31×98, to 14×47, to 5×22, to 3×20, and to 1×18. To reduce the spatial resolution, filters or kernels of any of a number of sizes may be used, such as a 5×5 kernel, a 3×3 kernel, and so on. In order to reduce the spatial resolution to a final spatial resolution of the convolution stream 148 (e.g., 1×18, as illustrated in FIG. 1C) there may be any number of convolutional layers. In addition, in order to reduce the spatial resolution from a first spatial resolution (e.g., 66×200) to a second spatial resolution (e.g., 31×98), one, three, twenty-four, thirty-six, forty-eight, sixty-four, and/or a different number of layers may be used within the convolutional stream(s) 148.

The CNN 108B may include one or more fully connected layers 150. The fully connected layer(s) 150 may receive the output of the convolutional stream(s) 148, or there may be one or more layers between the output of the convolutional stream(s) 148 and the fully connected layer(s) 150, depending on the embodiment. The fully connected layer(s) 150 may also be referred to herein as the output layer(s) of the CNN 108B, and generate the outputs 110. The final fully connected layer may include a number of neurons that corresponds to the output array, discussed herein. For example, where forty trajectory points in 3D world space are computed by the CNN 108B, the final fully connected layer 150 may include 120 neurons (e.g., forty trajectory points each having an x, y, and z value, so 40×3). In other examples, depending on the number of trajectory points to be computed by the CNN 108B and whether the trajectory points are computed in 2D or 3D space, the number of output neurons may differ.

Although the CNN 108B is described with respect to normalization layer(s) 146, convolutional layer(s), input layer(s) 144, and fully connected layer(s) 150, this is not intended to be limiting. Depending on the embodiment, the CNN 108B may include additional or alternative layer types, such as, but not limited to, those described herein (e.g., with respect to FIG. 1B). In addition, the size of the filters, the number of filters, the number of layers, the hyper-parameters, the functions, and/or other features and functionality of the CNN 108B may differ depending on the embodiment, without departing from the scope of the present disclosure.

Figure 2A:
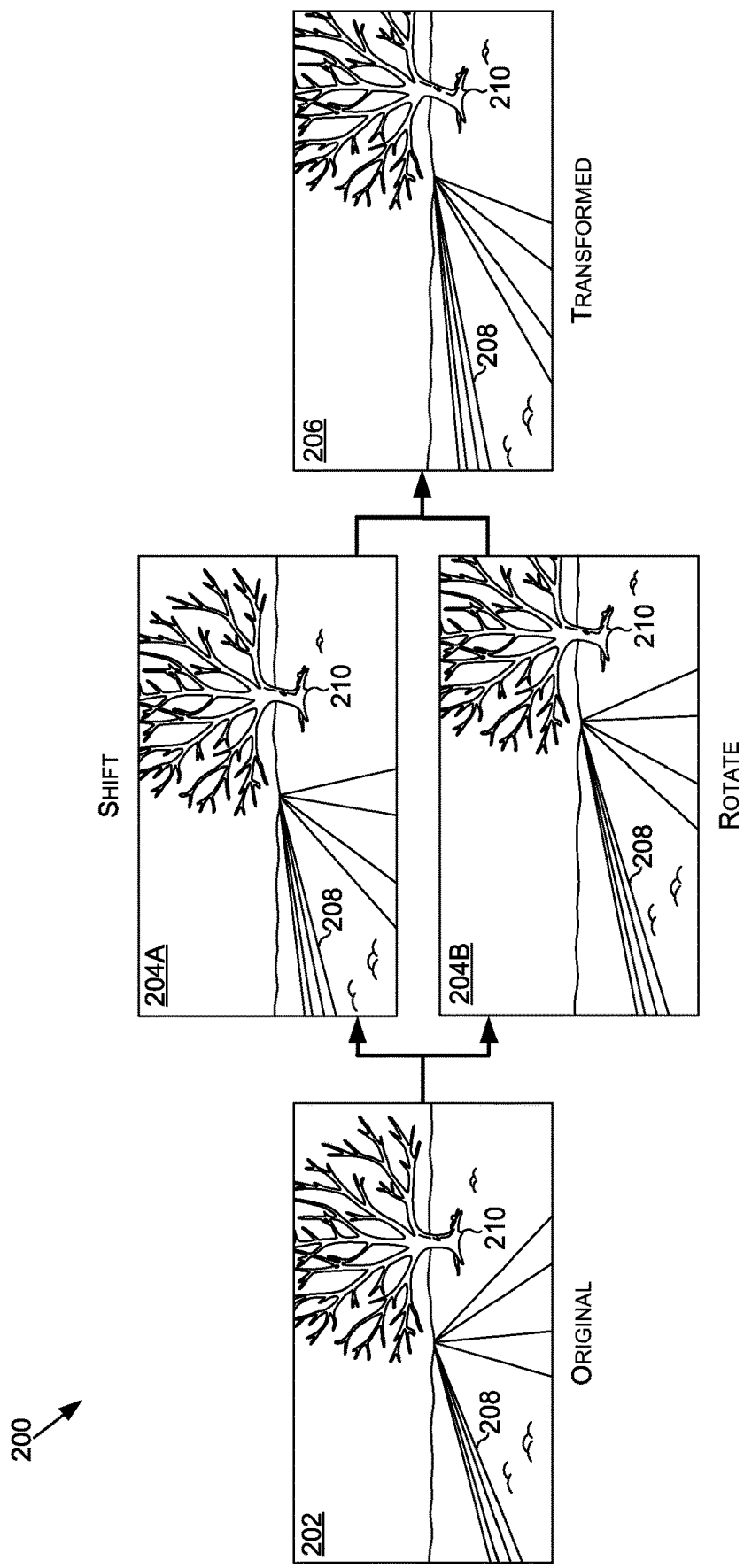
FIG. 2A is an illustration of an example process for generating transformed image data, in accordance with some embodiments of the present disclosure.

Now referring to FIG. 2A, FIG. 2A is an illustration of an example process 200 for generating transformed image data, in accordance with some embodiments of the present disclosure. The process 200 may be used to train the machine learning model(s) 108 to learn an accurate trajectory even when the vehicle 138 is off-center and/or off-orientation. For example, because it may not be desirable for a driver during data collection to drive off-center or off-orientation, viewpoint transforms may be used to simulate this effect, such that the machine learning model(s) 108 learn to generate accurate, usable trajectories even when the vehicle 138 is off-center and/or off-orientation. In addition, the process 200 may be used to account for position, orientation, lens distortion, and/or other variables of the different cameras or sensors, and their associated vehicles that may capture image data 104 and/or sensor data 106 during training and/or deployment of the machine learning model 108. For example, the cameras and/or sensors may be positioned differently (e.g., left or right of center, up or down with respect to a ground plane, etc.) on different vehicle types, may be at a different rotation (e.g., angled left, angled right, angled down, angled up, etc.), and/or may have different lens distortion (or other camera parameters), each of which may affect the perspective of the cameras and/or sensors.

The process 200 may include using an original image 202 (e.g., an image as captured by a camera) and shifting (e.g., as illustrated by shifted image 204A) and/or rotating (e.g., as illustrated by rotated image 204B) the original image 202 to generate a transformed (or augmented) image 206. For example, lane markings 208 and tree 210 from the original image 202 may be shifted (e.g., to the left) in the shifted image 204A and/or rotated (e.g., clockwise) in the rotated image 204B to generate the transformed image 206 that—in the illustration of FIG. 2A—includes the lane markings 208 and the tree 210 both shifted and rotated with respect to their positions in the original image 202. Although illustrated as two separate processes, and including two separate images (e.g., 204A and 204B), the transformations may be applied as a single process (e.g., using a single transformation) that both shifts and/or rotates the original image 202 to generate the transformed image 206. As such, the shifted image 204A and the rotated image 204B may be for visualization and example purposes only, and may not actually be generated during execution of the process 200.

Figure 4:
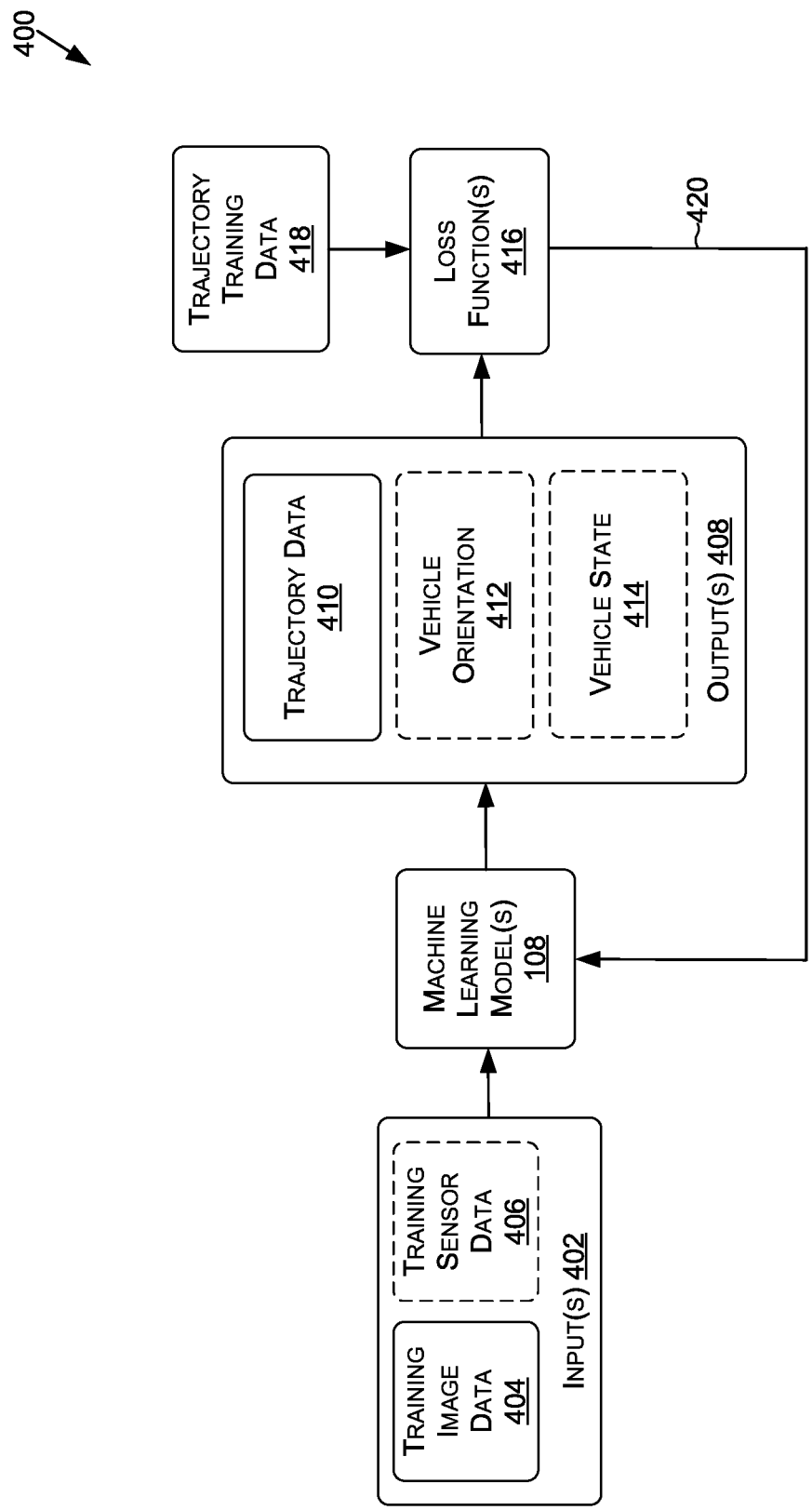
FIG. 4 is a data flow diagram illustrating an example process for training a machine learning model(s) to generate path planning information, in accordance with some embodiments of the present disclosure.

In some examples, the determination of the transformation to be applied may be based on an ideal or reference camera or sensor. For example, during data capture (e.g., training image data 404 and/or training sensor data 406 of FIG. 4), any number of different cameras and/or sensors of any number of different vehicles may be used to generate the training data for the machine learning model(s) 108. However, the image data and/or the sensor data may not be from the same perspective for each camera and/or each sensor. For example, as described herein, the location, orientation, lens distortion, and/or other camera or sensor parameters (intrinsic and/or extrinsic) may be different for each different camera, sensor, and/or vehicle. As such, in order to train the machine learning model(s) 108 using data from consistent perspectives, the image data and/or sensor data may be transformed (e.g., shifted, rotated, etc.) to a perspective of an ideal or reference camera (e.g., a virtual or imaginary camera having a set of parameters). The machine learning model(s) 108 may be trained using this transformed image data and/or transformed sensor data as the training image data 404 and/or the training sensor data 406 (FIG. 4).

In addition, during deployment of the machine learning model(s) 108 on any number of different vehicles that may use any number of different cameras and/or sensors, the image data 104 and/or the sensor data 106 captured may be similarly transformed to the perspective of the ideal or reference camera or sensor. For example, the image data 104 and/or the sensor data 106 may be shifted, rotated, and/or otherwise transformed (or augmented) to generate transformed image data and/or transformed sensor data from the perspective of the ideal or reference camera or sensor. As such, the machine learning model(s) 108 may be trained on, and deployed using, the image data and/or the sensor data from the same perspective(s). This may result in more accurate results for the machine learning model(s) 108, especially in embodiments where the machine learning model(s) 108 are end-to-end systems whose outputs 110 are directly usable by the vehicle 138 (e.g., by the control component(s) 118 without any post-processing).

Figure 2B:
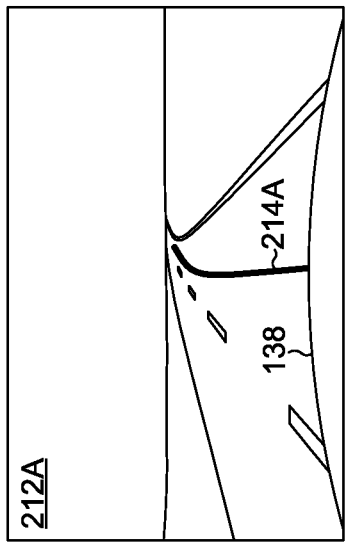
FIG. 2B includes example visualizations of trajectories generated by a machine learning model(s) after conversion to image space, in accordance with some embodiments of the present disclosure.
Figure 2B:
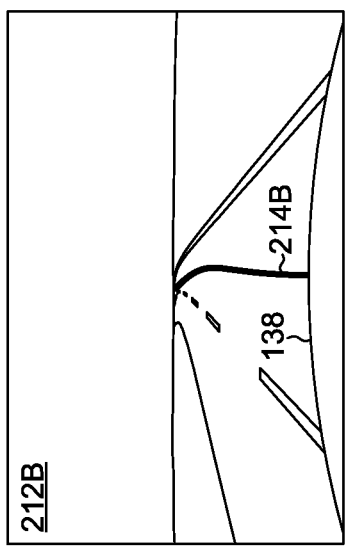
Figure 2B:
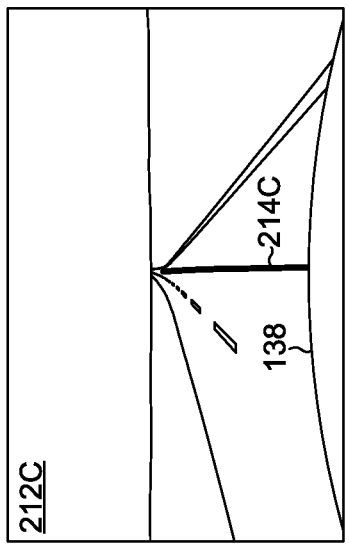

FIG. 2B includes example visualizations of trajectories generated by a machine learning model(s) after conversion to image space, in accordance with some embodiments of the present disclosure. FIG. 2B includes a first visualization 212A, a second visualization 212B, and a third visualization 212C (collectively referred to herein as "visualizations 212"). The visualizations 212 may include representations, in 2D image space and associated with images represented by the image data 104, of the trajectory data 112 generated by the machine learning model(s) 108. For example, because the machine learning model(s) 108 may generate the trajectory points in 2D or 3D world space, in order to visualize these trajectories the trajectory data 112 may need to be converted to 2D image space coordinates. As such, FIG. 2B includes three example visualizations of trajectories 214A, 214B, and 214C (as converted from the trajectory data 112 output by the machine learning model(s) 108) extending from the vehicle 138 into a physical environment (e.g., along a driving surface). The visualizations 212 may be used for determining key performance indicators (KPIs), for display during testing, for display during deployment (e.g., on an HMI display 634 of the vehicle 138), and/or for other purposes.

Figure 3:
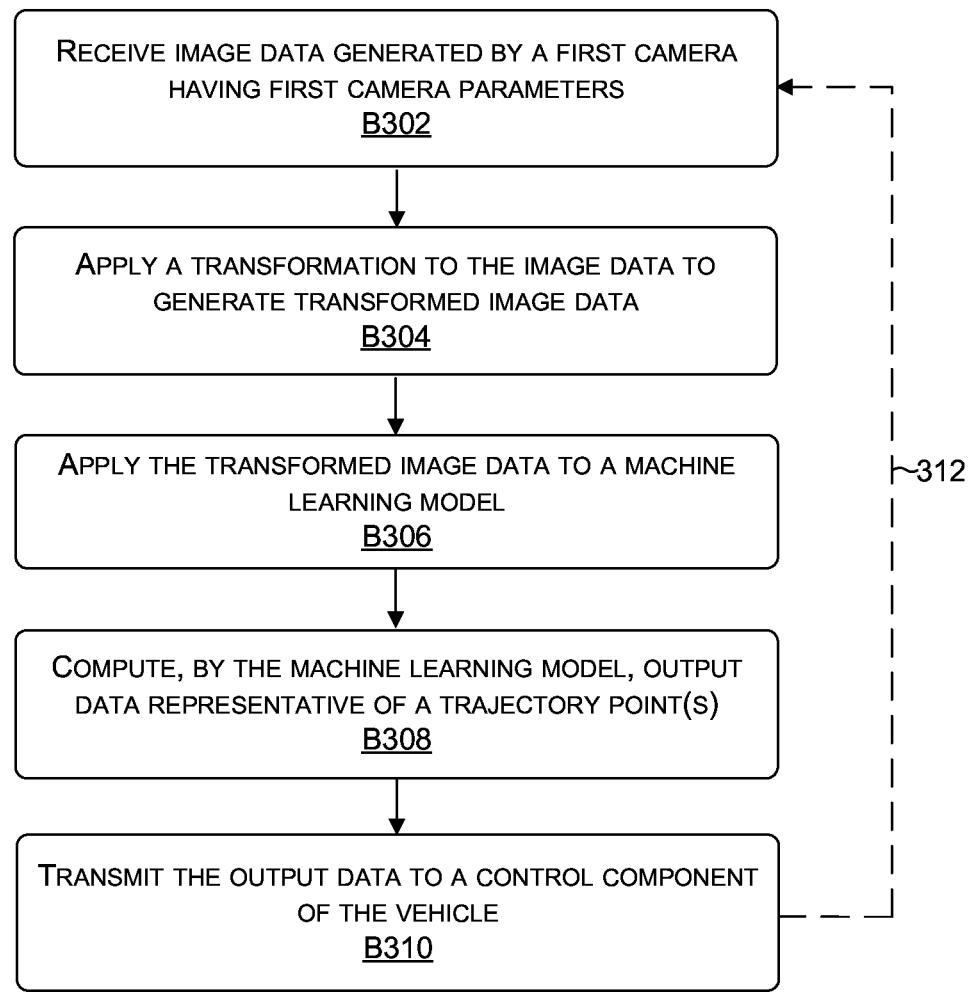
FIG. 3 is a flow diagram showing a method for generating a trajectory from transformed image data, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the process 100 of FIG. 1A and the process 200 of FIG. 2A. However, the method 300 may additionally or alternatively be executed by any one system, or any combination of systems, including, but not limited to, those described herein.

FIG. 3 is a flow diagram showing a method 300 for generating a trajectory from transformed image data, in accordance with some embodiments of the present disclosure. The method 300, at block B302, includes receiving image data generated by a first camera having first camera parameters. For example, the image data 104 may be received after generation by a first camera of the vehicle 138. The image data 104 may be representative of a captured image, such as the original image 202 in FIG. 2A.

The method 300, at block B304, includes applying a transformation to the image data to generate transformed image data. For example, a transformation (e.g., shifting, rotating, etc.) may be applied to the image data to generate transformed image data. The transformation may transform the image data from a perspective of the first camera of the vehicle 138 to a perspective of a reference or ideal camera.

The method 300, at block B306, includes applying the transformed image data to a machine learning model. For example, the transformed image data (e.g., as the image data 104) may be applied to a machine learning model(s) 108, such as a CNN.

The method 300, at block B308, includes computing, by the machine learning model, output data representative of a trajectory point(s). For example, the machine learning model(s) 108 may compute the output(s) 110 based at least in part on the transformed image data, where the outputs include the trajectory data 112. The trajectory data 112, as described herein, may represent one or more trajectory points in 2D or 3D world space along a predicted or recommended trajectory.

The method 300, at block B310, includes transmitting the output data to a control component of the vehicle. For example, the output(s) 110 may be transmitted to the control component(s) 118 of the vehicle 138. In some examples, the control component(s) 118 may use the trajectory points as a point of reference to navigate towards. As such, the control component(s) 118 may determine the steering angle, acceleration, and/or deceleration for the vehicle 138 that may be executed to control the vehicle 138 (or the origin point of the vehicle 138) to each trajectory point.

The method 300 may repeat for each image represented by the image data as the vehicle moves through the environment, as represented by dashed arrow 312.

Although the method 300 is described with respect to image data and cameras, this is not intended to be limiting. In some examples, in addition to or alternatively from cameras, the method 300 may be applied to sensor data generated from one or more sensors. For example, the sensor data from a LIDAR sensor may be transformed to a perspective of a reference or ideal LIDAR sensor. In this way, the machine learning model(s) 108 may be trained on, and deployed using, sensor data from the perspective of the ideal or reference sensor.

Training the Machine Learning Model(s) for Trajectory Generation

The system of the present disclosure may use automatic labeling or annotations as ground truth data to train a machine learning model—such as the DNN(s) described herein—to compute trajectory points, a vehicle orientation (e.g., with respect to features of the environment, such as lane markings), and/or a vehicle state (e.g., with respect to a vehicle maneuver, such as a lane change, a turn, a merge, etc.). For example, as image data is collected, additional sensor data may also be collected that tracks orientation, steering information, and/or speed of a vehicle. The additional sensor data may be used to automatically generate (e.g., using a dead reckoning process) a trajectory—represented by 2D or 3D trajectory points in world space—that may be used as ground truth data for training the DNN. By using the sensor data to automatically generate the ground truth data, the system may scale easily by collecting more data—thereby reducing the additional tasks of manual labeling and annotations on any new data collected.

During training data collection, image data, LIDAR data, SONAR data, audio data, and/or other data types may be captured for use as inputs to the DNN. At the same time, sensor data from steering sensors, IMU sensors, speed sensors, and/or the like, may be captured to reconstruct trajectories (e.g., trajectory points in 2D or 3D world space) that correspond to the image data, LIDAR data, SONAR data, audio data, etc. As such, during training, outputs of the DNN may be compared to the trajectory points in world space—thereby intrinsically training the DNN to account for the conversion from 2D pixel coordinates to 2D or 3D world space coordinates without any pre or post-processing being required to do the same.

In some embodiments, the DNN may be trained to predict state information—such as the state of a vehicle maneuver. In such embodiments, some manual ground truth generation may be required (e.g., manual labeling or annotating). For example, for a lane change, progress through the lane change may be represented using a manual label associated with an image captured during the lane change, and for a turn, progress through the turn may be represented using a manual label associated with an image captured during the turn. In such embodiments, the DNN may be trained using the automatically generated trajectory information and the manually labeled state information as ground truth data to learn to compute trajectory point(s) and state information.

Now referring to FIG. 4, FIG. 4 is a data flow diagram illustrating an example process 400 for training a machine learning model(s) to generate path planning information, in accordance with some embodiments of the present disclosure. In some embodiments, the machine learning model(s) 108, such as those described herein, may be trained using the process 400. Input(s) 402 may include training image data 404 and/or training sensor data 406, which may be similar to the image data 104 and/or the sensor data 106, respectively, but may correspond to the training data used for training the machine learning model(s) 108. As described herein, the training image data 404 and/or the training sensor data 406 may be transformed to a perspective of an ideal or reference camera prior to input to the machine learning model(s) 108. In addition, other types of pre-processing of the data may be executed, such as but not limited to those described herein with respect to the image data 104 and/or the sensor data 106. Output(s) 408 may include trajectory data 410, vehicle orientation 412, and/or vehicle state 414, which may be similar to the trajectory data 112, the vehicle orientation 114, and/or the vehicle state 116, respectively, but may correspond to the outputs of the machine learning model(s) 108 during training.

Trajectory training data 418 may be used as ground truth data for training the machine learning model(s) 108—using one or more loss functions 416—to generate the output(s) 408. The trajectory training data 418 may be generated by one or more sensors of one or more vehicles that generate the training image data 404 and/or the training sensor data 406 as the vehicle(s) is controlled through the environment. In some embodiments, the vehicle(s) may be controlled through the physical environment by a human driver(s), such that the path represented by the trajectory training data 418 is representative of the path(s) that the human driver(s) have taken. For example, the trajectory training data 418 may include trajectory data generated during an exclusively, or almost exclusively, human-piloted portion of a path taken by a vehicle. In some examples, the human-piloted portion of the path may be from a remotely located human pilot, such as a human piloting a vehicle from a remote simulator. The trajectory training data 418 may thus include trajectory data automatically labeled and associated with the representations or instances of the sensor data 406 based on correlating the perception sensor data to speed, orientation, and/or other data generated during a human-piloted portion of vehicle operation. The trajectory training data 418 may be used to train the machine learning model(s) 108 not only on the actual path driven, but may account for cues in the input(s) 402 that resulted in such a path.

In other examples, the trajectory training data 418 may include annotated trajectories or paths in a 2D image or sensor space and transformed to a trajectory label in 3D world coordinates. For example, annotations may be made to representations or instances (e.g., images, depth maps, etc.) of the sensor data 406 in coordinates related to the sensor data 406 (e.g., with respect to images, 2D image coordinates), and the annotations may be transformed to 3D world coordinates (e.g., representing the trajectory through a real-world environment) prior to use as ground truth data. However, in some examples, manual labeling may not be made to account for certain features of the environment (e.g., a large object in an adjacent lane, a pothole, etc.). In addition, manual labeling may generally result in middle of the lane labels, and thus may not account for these natural maneuvers and changes in path or trajectory that a human driver may make to account for the specific physical environment. In some examples, a combination of automatically generated trajectories from human-piloted operation of a vehicle and manual annotations may be used.

In some embodiments, each vehicle that captures the training image data 404 and/or the training sensor data 406 (e.g., LIDAR data, SONAR data, etc.) may generate the training trajectory data 418 at the same time as capturing the training image data 404 and/or the training sensor data 406. As such, as the vehicle capturing the training image data 404 and/or the training sensor data 406 navigates through an environment (e.g., along a road or other driving surface), the training trajectory data 418 may be generated by one or more IMU sensors 666, steering sensors from a steering system 654, speed sensor(s) 644 (e.g., speedometer), and/or other sensor types to record or reconstruct the path of the vehicle through the environment. For example, the training trajectory data 418 may be generated using one or more processes, such as a dead reckoning process, to reconstruct the 2D or 3D world space path (e.g., using world space coordinates) of the vehicle through the environment that may correspond, at least in part, to the training image data 404 and/or the training sensor data 406. The training trajectory data 418 may be representative of a trajectory, or trajectory points, which may be used as ground truth data for training the machine learning model(s) 108 to generate the outputs 408, such as the trajectory data 410, at an acceptable level of accuracy.

As a non-limiting example, a camera of a vehicle performing data capture may generate image data representative of an image of a physical environment that the vehicle is in (e.g., an image of a field of view to the front of the vehicle). The image data may be generated at a time, $t_1$. The vehicle may be moving forward in world space, and during and after the image data is captured, the training trajectory data 418 may be captured by the vehicle using any number of sensors, such as those described herein. This training trajectory data may thus be captured over a period of time—which may include a time, $t_2$, after the time, $t_1$—where the vehicle is driving through the portion of the physical environment represented in the image. As a result, the training trajectory data 418 may be used to reconstruct, in 2D or 3D world space, the path of the vehicle through the portion of the physical environment. The path, which is through the portion of the physical environment represented in the image, may then be associated with the image (e.g., automatically) as a label or annotation for use as ground truth data.

For example, the trajectory, or trajectory points, may be used as labels or annotations that correspond to the training image data 404 and/or the training sensor data 406. In such an example, the reconstructed trajectory from the trajectory training data 418 may be associated with the captured images and/or other data representations from one or more sensors of the vehicle (e.g., LIDAR sensors, RADAR sensors, etc.). The labels or annotations may be automatically generated using the trajectory training data 418, and thus may not require any manual labeling for generating of ground truth data. However, in some examples, manual labeling may be performed in addition to, or alternatively from, the automatic labeling. As such, in any example, the labels may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., training trajectory data 418 is used to automatically generate a label, and human corrects any errors). In some examples, for each input image, or for each input sensor data representation, there may be a corresponding label of the path.

The machine learning model(s) 108 may perform forward pass computations on the training image data 404 and/or the training sensor data 406. In some examples, the machine learning model(s) 108 may learn recommended trajectories that correspond to 2D or 3D world space coordinates (e.g., as represented by trajectory points) that correspond to recommended or predicted trajectories for each image and/or sensor data representation. The loss function(s) 316 may be used to measure loss (e.g., error) in the output trajectory data 410 and/or other output(s) 408 (e.g., as predicted by the machine learning model(s) 108) as compared to the ground truth data (e.g., the labels or annotations corresponding to the trajectory training data 418). For example, a binary cross entropy loss function, mean squared error (L2) loss function, L1 loss function, and/or other loss function type may be used as the loss function(s) 316. In some embodiments, two or more different loss functions may be used. For example, one or more loss functions may be used for each type of output 408 where there are two or more outputs 408, or two or more loss functions may be used for a single output type. Where two or more loss functions are used for a single output type (e.g., for the trajectory data 410), the loss functions may be weighted with respect to one another to generate a weighted loss function. Backward pass computations may be performed to recursively compute gradients of the loss function with respect to training parameters (e.g., weights, biases, etc.), as indicated by arrow 420. In some examples, weight and biases of the machine learning model(s) 108 may be used to compute these gradients.

In some examples, as described herein, distance based weighted loss may be added to the loss function 316, where the loss function 316 may increasingly penalize loss at farther distances from the bottom of the image or other data representation (or from the vehicle), as described herein. A distance based weighted loss function penalizes more errors on the far distance, and therefore improves the accuracy of the predicted trajectory, or trajectory points, in the far distance.

In some examples, such as where the vehicle orientation 412 and/or the vehicle state 414 is predicted by the machine learning model(s) 108, the training process specific to these outputs 408 may be similar to the disclosure of U.S. Non-Provisional application Ser. No. 16/241,005, filed on Jan. 7, 2019, and hereby incorporated by reference in its entirety.

The machine learning model(s) 108 may thus be trained to receive the image data 104 and/or the sensor data 106 as inputs 102 (FIG. 1A), and generate the trajectory data 112, the vehicle orientation 412, the vehicle state 414, and/or other outputs 110. In addition, because the machine learning model(s) 408 may be trained using trajectory training data 418 generated during and/or immediately after the time the input(s) 402 are captured, the machine learning model(s) 108 may be trained to generate 2D or 3D world space coordinates as the trajectory data 410. As such, the machine learning model(s) 108 may be trained to implicitly account for the conversion from 2D image space to 2D or 3D world space using automatically generated labels or annotations from the trajectory training data 418. By accounting for this conversion implicitly, the amount of post-processing is reduced, and the outputs 110 of the machine learning model(s) 108 may be directly usable by the control component(s) 118, and/or other component(s) of the vehicle 138 (e.g., one or more component(s) of an autonomous driving software stack).

Figure 5A:
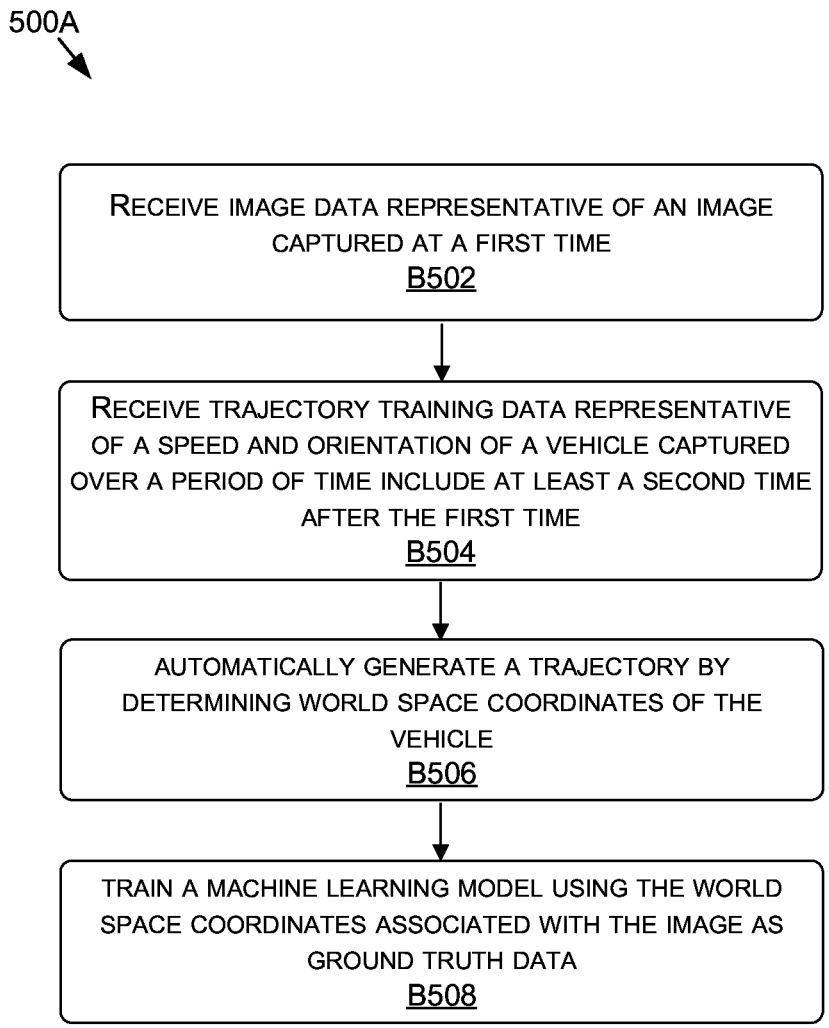

Now referring to FIGS. 5A-5C, each block of methods 500A, 500B, and 500C, described herein, comprises a computing process that may be performed using any combination of hardware, firmware, and/or software. For instance, various functions may be carried out by a processor executing instructions stored in memory. The methods 500A, 500B, and 500C may also be embodied as computer-usable instructions stored on computer storage media. The methods 500A, 500B, and 500C may be provided by a standalone application, a service or hosted service (standalone or in combination with another hosted service), or a plug-in to another product, to name a few. In addition, methods 500A, 500B, and 500*c* are described, by way of example, with respect to the process 400 of FIG. 4. However, these methods 500A, 500B, and 500C may additionally or alternatively be executed by any one system, or any combination of systems, including, but not limited to, those described herein.

FIG. 5A is a flow diagram showing a method 500A for training a machine learning model(s) to generate path planning information, in accordance with some embodiments of the present disclosure. The method 500A, at block B502, includes receiving image data representative of an image captured at a first time. For example, training image data 404 generated by a camera of a vehicle at a time, $t_1$, may be received.

The method 500A, at block B504, includes receiving trajectory training data representative of a speed and orientation of a vehicle captured over a period of time including at least a second time after the first time. For example, trajectory training data 418 may be received, where the trajectory training data 418 was captured over a period of time that includes at least a time, $t_2$, after the time, $t_1$.

The method 500A, at block B506, includes automatically generating a trajectory by determining world space coordinates of the vehicle. For example, the trajectory training data 418 may be used to automatically generate a trajectory, or trajectory points, for the vehicle in 2D or 3D world space. The trajectory may be associated with the image because the trajectory may represent a path of the vehicle through a portion of a physical environment represented by the image.

The method 500A, at block B508, includes training a machine learning model using the world space coordinates associated with the image as ground truth data. For example, the machine learning model(s) 108 may be trained using the world space coordinates generated from the trajectory training data 418 as ground truth data (e.g., as labels or annotations associated with the image).

FIG. 5B is a flow diagram showing a method 500B for training a machine learning model(s) to generate path planning information, in accordance with some embodiments of the present disclosure. The method 500B, at block B512, includes receiving trajectory training data and sensor data representative of a sensor field of a sensor. For example, the trajectory training data 418 and the image data 404 and/or the sensor data 406 may be received, where the image data 404 and/or the sensor data 406 may be representative of one or more images, depth maps, SONAR data representations, a combination thereof, and/or the like.

The method 500B, at block B514, includes generating trajectories for each image of the images. For example, for each image a trajectory, or trajectory points, may be generated using the trajectory training data. Block B514 may be executed using the method 500C of FIG. 5C. For example, the method 500C, at block B514A, includes generating a trajectory for the vehicle using a subset of the trajectory training data corresponding to a path of the vehicle. For example, a subset of the trajectory training data that corresponds to a path of the vehicle through the portion of the physical environment represented in the respective sensor data representation may be used to generate a trajectory, or trajectory points. The method 500C, at block B514B, includes associating the trajectory with the representation of the sensor data. For example, the trajectory, or trajectory points, may be associated with the respective representation of the image data 404 (e.g., an image) and/or sensor data 406 as labels or annotations.

The method 500B, at block B516, includes applying the sensor data as input to a machine learning model. For example, the image data 404 and/or the sensor data 406 representing may be applied to the machine learning model(s) 108 as an input(s) 402.

The method 500B, at block B518, includes training the machine learning model based on comparing outputs computed by the machine learning model to the trajectories. For example, the machine learning model(s) 108 may be trained by comparing the output(s) 408 of the machine learning model(s) 108 (e.g., the trajectory data 410) to the trajectories generated or reconstructed from the trajectory training data 418.

Example Autonomous Vehicle

Figure 6A:
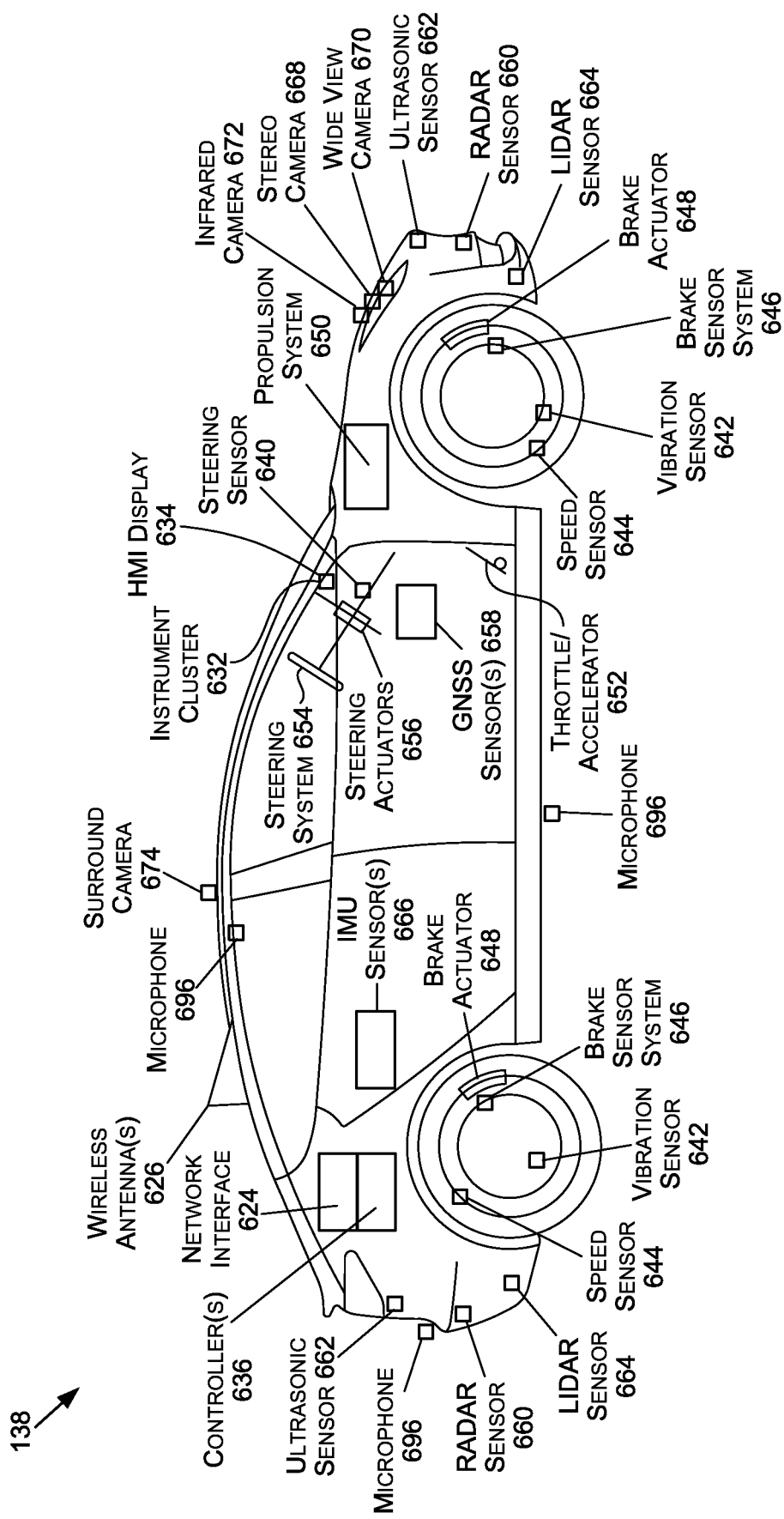
FIG. 6A is an illustration of an example autonomous vehicle, in accordance with some embodiments of the present disclosure.

FIG. 6A is an illustration of an example autonomous vehicle 138, in accordance with some embodiments of the present disclosure. The autonomous vehicle 138 (alternatively referred to herein as the "vehicle 138") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 138 may be capable of functionality in accordance with one or more of Level 3-Level 5 of the autonomous driving levels. For example, the vehicle 138 may be capable of conditional automation (Level 3), high automation (Level 4), and/or full automation (Level 5), depending on the embodiment.

The vehicle 138 may include components such as a chassis, a vehicle body, wheels (e.g., 2, 4, 6, 8, 18, etc.), tires, axles, and other components of a vehicle. The vehicle 138 may include a propulsion system 650, such as an internal combustion engine, hybrid electric power plant, an all-electric engine, and/or another propulsion system type. The propulsion system 650 may be connected to a drive train of the vehicle 138, which may include a transmission, to enable the propulsion of the vehicle 138. The propulsion system 650 may be controlled in response to receiving signals from the throttle/accelerator 652.

A steering system 654, which may include a steering wheel, may be used to steer the vehicle 138 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 138. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 138. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 138 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 138), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 138 and provide outputs (e.g., represented by output data, display data, etc.) via a human-machine interface (HMI) display 634, an audible annunciator, a loudspeaker, and/or via other components of the vehicle 138. The outputs may include information such as vehicle velocity, speed, time, map data (e.g., the HD map 622 of FIG. 6C), location data (e.g., the vehicle's 138 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 138 further includes a network interface 624 which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 6B:
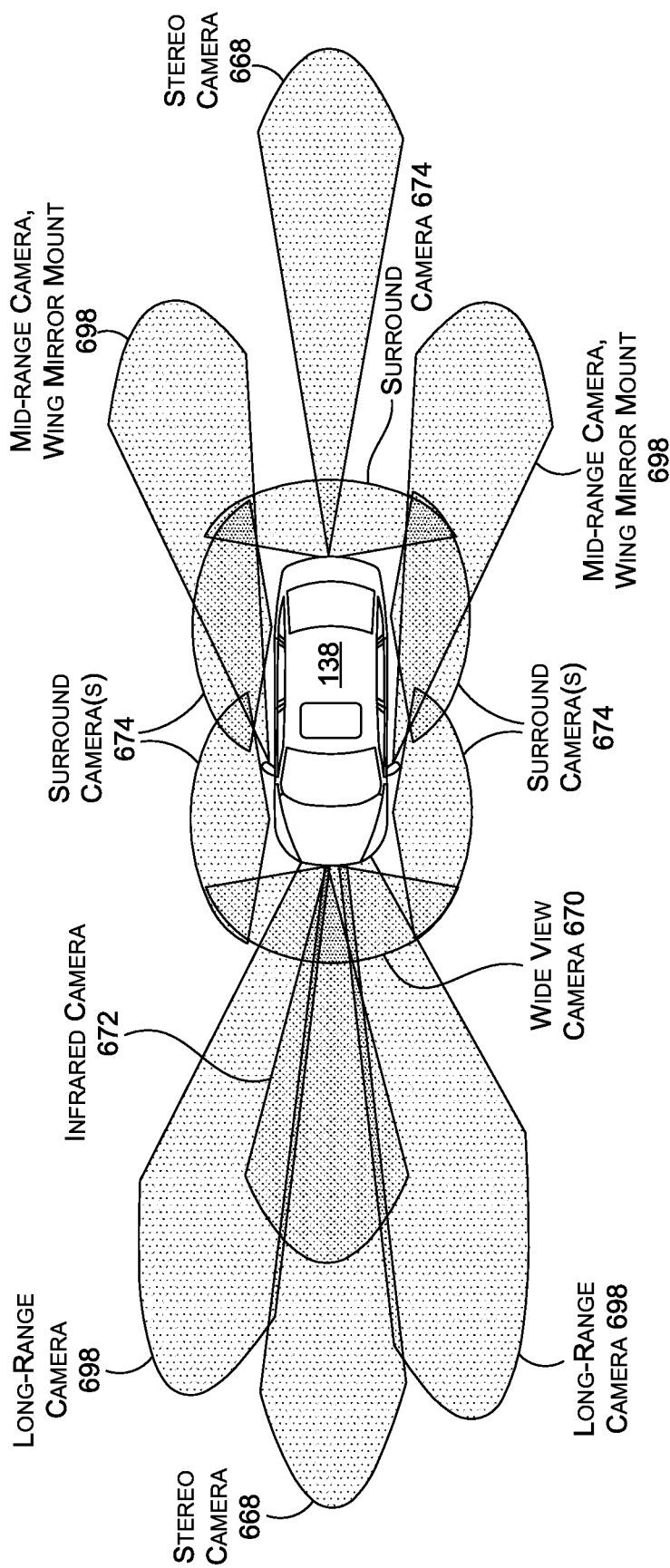
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 138 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 138.

The camera types for the cameras may include, but are not limited to, digital cameras that may be adapted for use with the components and/or systems of the vehicle 138. The camera(s) may operate at automotive safety integrity level (ASIL) B and/or at another ASIL. The camera types may be capable of any image capture rate, such as 60 frames per second (fps), 620 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 138 (e.g., front-facing cameras) may be used for surround view, to help identify forward facing paths and obstacles, as well as aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Adaptive Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may be any number of wide-view cameras 670 on the vehicle 138. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 138 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 138. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 138 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
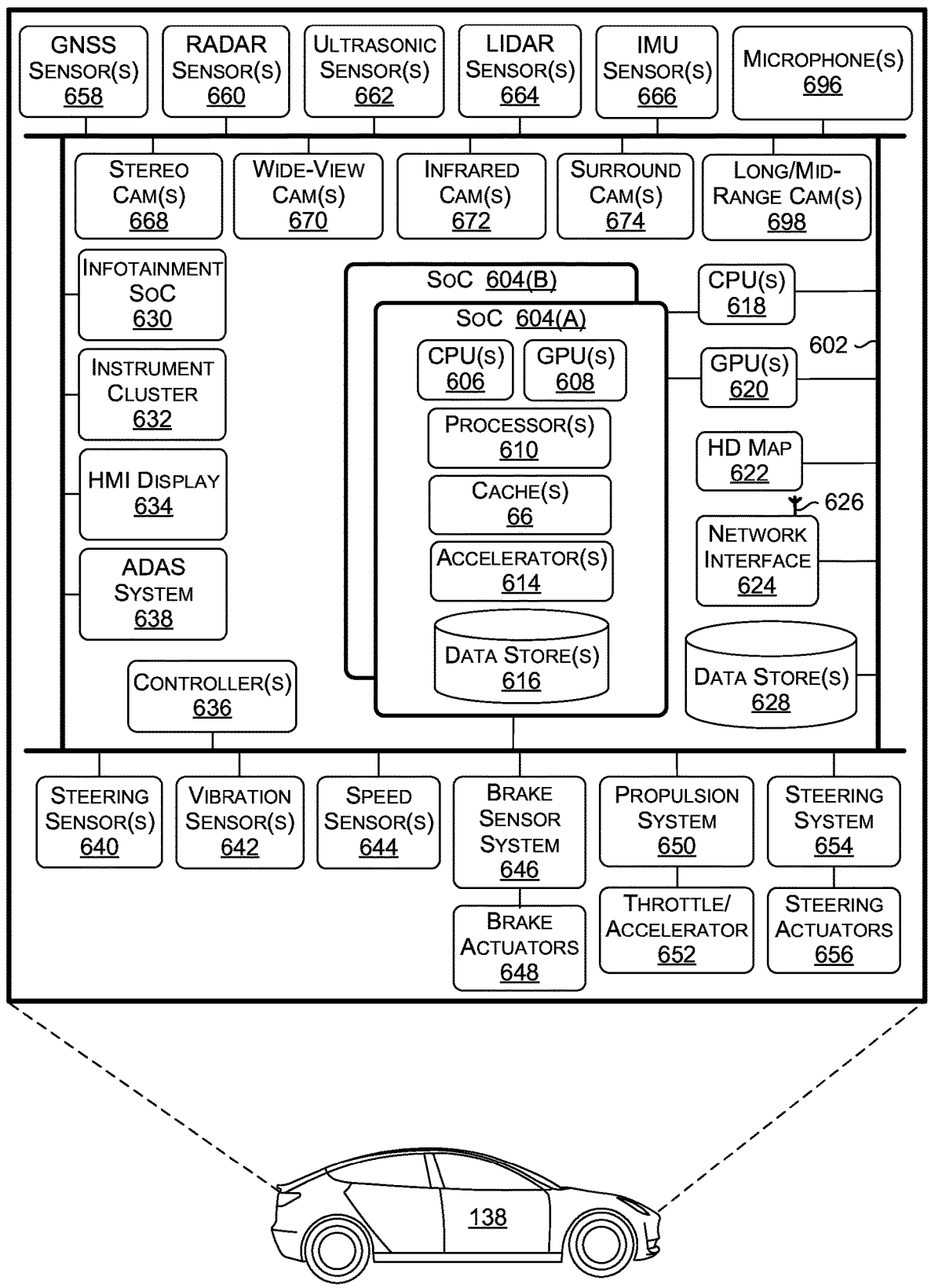
FIG. 6C is a block diagram of an example system architecture for the example autonomous vehicle of FIG. 6A, in accordance with some embodiments of the present disclosure.

FIG. 6C is a block diagram of an example system architecture for the example autonomous vehicle 138 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 138 in FIG. 6C are illustrated as being connected via bus 602. The bus 602 may include a Controller Area Network (CAN) data interface (alternatively referred to herein as a "CAN bus"). A CAN may be a network inside the vehicle 138 used to aid in control of various features and functionality of the vehicle 138, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 138, and two or more busses 602 may communicate with the same components. In some examples, each SoC 604, each controller 636, and/or each computer within the vehicle may have access to the same input data (e.g., inputs from sensors of the vehicle 138), and may be connected to a common bus, such the CAN bus.

The vehicle 138 may include one or more controller(s) 636, such as those described herein with respect to FIG. 6A. The controller(s) 636 may be used for a variety of functions. The controller(s) 636 may be coupled to any of the various other components and systems of the vehicle 138, and may be used for control of the vehicle 138, artificial intelligence of the vehicle 138, infotainment for the vehicle 138, and/or the like.

The vehicle 138 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 138 in a variety of platforms and systems. For example, the SoC(s) 604 may be combined in a system (e.g., the system of the vehicle 138) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 138 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 138 into a chauffeur to safe stop mode (e.g., bring the vehicle 138 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 138, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 138. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 138 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 138.

The vehicle 138 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 138 information about vehicles in proximity to the vehicle 138 (e.g., vehicles in front of, on the side of, and/or behind the vehicle 138). This functionality may be part of a cooperative adaptive cruise control functionality of the vehicle 138.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 138 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 138 may further include GNSS sensor(s) 658. The GNSS sensor(s) 658 (e.g., GPS and/or assisted GPS sensors), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 138 may further include RADAR sensor(s) 660. The RADAR sensor(s) 660 may be used by the vehicle 138 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 138 surroundings at higher speeds with minimal interference from traffic in adjacent lanes. The other two antennae may expand the field of view, making it possible to quickly detect vehicles entering or leaving the vehicle's 138 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 138 may further include ultrasonic sensor(s) 662. The ultrasonic sensor(s) 662, which may be positioned at the front, back, and/or the sides of the vehicle 138, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 138 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 138 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 138 m, with an accuracy of 2 cm-3 cm, and with support for a 138 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 138. The LIDAR sensor(s) 664, in such examples, may provide up to a 620-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 138. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 138, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 138 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 138. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 138. The types of cameras used depends on the embodiments and requirements for the vehicle 138, and any combination of camera types may be used to provide the necessary coverage around the vehicle 138. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 138 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 138 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 138 and automatically adjust the vehicle speed to maintain a safe distance from vehicles ahead. Lateral ACC performs distance keeping, and advises the vehicle 138 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle vehicle (I2V) communication link. In general, the V2V communication concept provides information about the immediately preceding vehicles (e.g., vehicles immediately ahead of and in the same lane as the vehicle 138), while the I2V communication concept provides information about traffic further ahead. CACC systems may include either or both I2V and V2V information sources. Given the information of the vehicles ahead of the vehicle 138, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 138 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 138 if the vehicle 138 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 138 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 138, the vehicle 138 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 138 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 138. For example, the infotainment SoC 630 may radios, disk players, navigation systems, video players, USB and Bluetooth connectivity, carputers, in-car entertainment, WiFi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 138. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 138) fail. In such an example, the infotainment SoC 630 may put the vehicle 138 into a chauffeur to safe stop mode, as described herein.

The vehicle 138 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
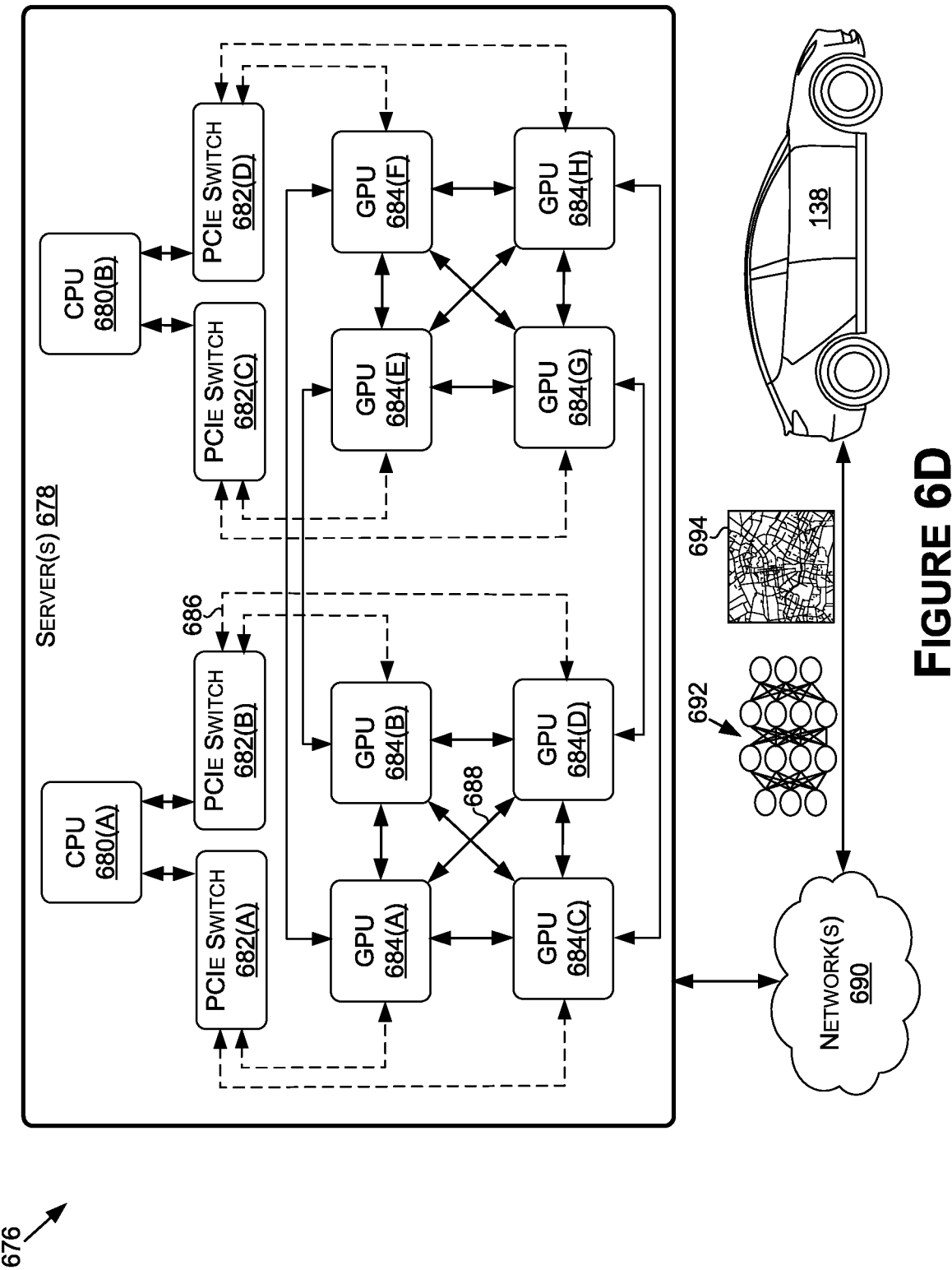
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 138 of FIG. 6A, in accordance with some embodiments of the present disclosure. The system 676 may include server(s) 678, network(s) 690, and vehicles, including the vehicle 138. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 138. For example, the deep-learning infrastructure may receive periodic updates from the vehicle 138, such as a sequence of images and/or objects that the vehicle 138 has located in that sequence of images (e.g., via computer vision and/or other machine learning object classification techniques). The deep-learning infrastructure may run its own neural network to identify the objects and compare them with the objects identified by the vehicle 138 and, if the results do not match and the infrastructure concludes that the AI in the vehicle 138 is malfunctioning, the server(s) 678 may transmit a signal to the vehicle 138 instructing a fail-safe computer of the vehicle 138 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
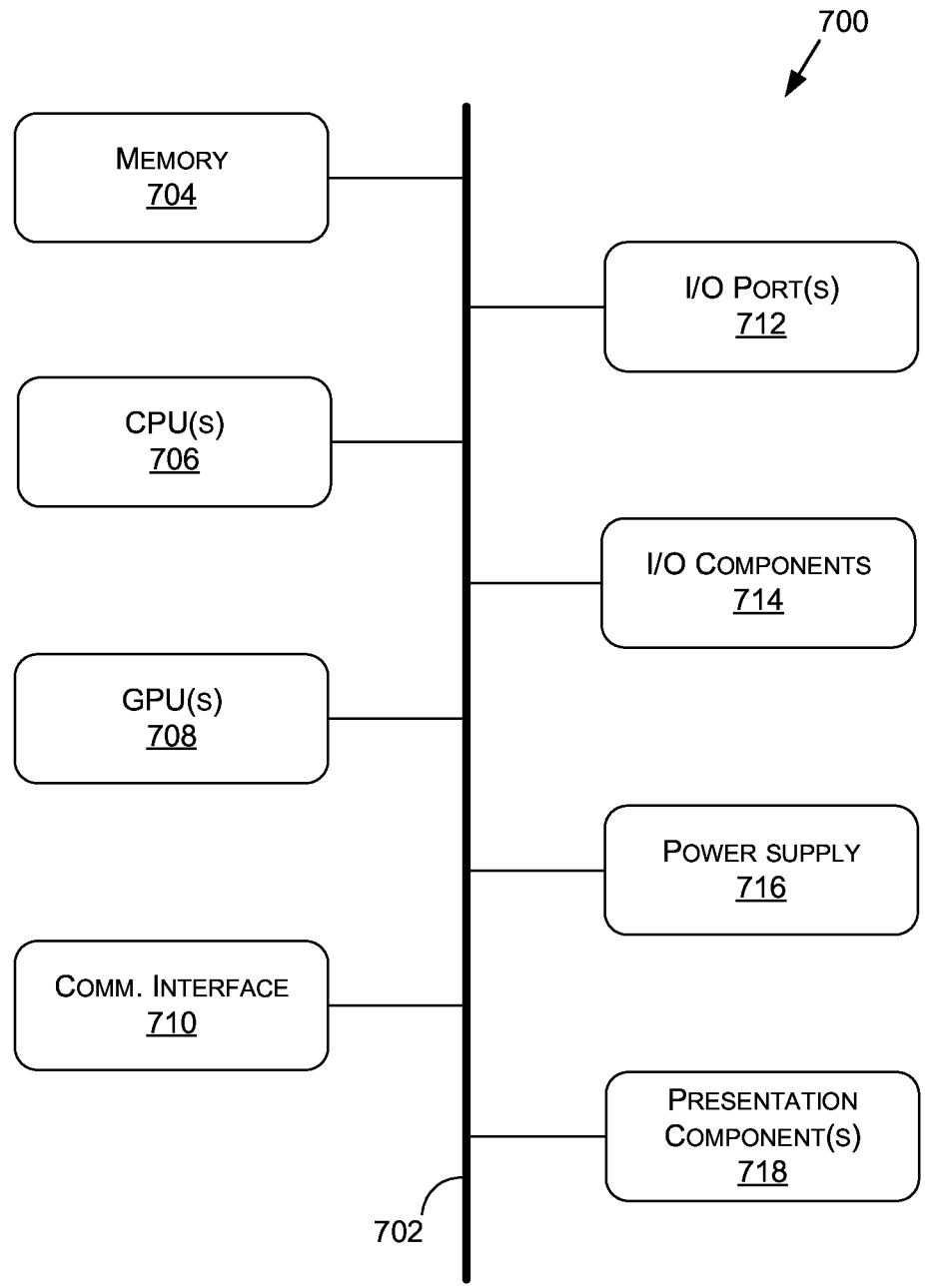
FIG. 7 is a block diagram of an example computing device suitable for use in implementing some embodiments of the present disclosure.

FIG. 7 is a block diagram of an example computing device 700 suitable for use in implementing some embodiments of the present disclosure. Computing device 700 may include a bus 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)).

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 702 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704. The GPU(s) 708 may include two or more GPUs operating in parallel (e.g., via a link). When combined together, each GPU 708 may generate pixel data for different portions of an output image or for different output images (e.g., a first GPU for a first image and a second GPU for a second image). Each GPU may include its own memory, or may share memory with other GPUs.

In examples where the computing device 700 does not include the GPU(s) 708, the CPU(s) 706 may be used to render graphics.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving sensor data representative of a sensory field of a sensor disposed or positioned on a vehicle moving through an environment;
computing, using one or more machine learning models and based at least on the sensor data, trajectory data representative of a world space trajectory for the vehicle, the one or more machine learning models being trained based at least on:
ground truth data representative of one or more trajectories used to navigate a data collection vehicle within a real-world environment;
image data generated using one or more image sensors of the data collection vehicle at least partly during navigation of the data collection vehicle along the one or more trajectories within the real-world environment, the image data representing one or more images depicting at least a portion of the real-world environment;
one or more annotations that relate the ground truth data to the image data, an individual annotation of the one or more annotations relating a location along a trajectory of the one or more trajectories with an image of the one or more images;
determining, using the one or more machine learning models and based at least on a portion of the image data representing the image, a predicted trajectory; and
comparing, based at least on the one or more annotations, the predicted trajectory to at least a portion of the trajectory of the one or more trajectories used to navigate the data collection vehicle within the real-world environment; and
causing the vehicle to navigate based at least on the world space trajectory.

2. The method of claim 1, wherein the one or more machine learning models are further trained using training data annotated in a two-dimensional (2D) image space and transformed to a trajectory label in three-dimensional (3D) world space coordinates, the 3D world space coordinates used as ground truth outputs of the one or more machine learning models.

3. The method of claim 1, wherein the world space trajectory comprises one or more trajectory points, a control component uses at least a trajectory point of the one or more trajectory points to generate a control profile for the vehicle, and the control profile includes at least one of accelerating, decelerating, or turning.

4. The method of claim 1, wherein the one or more machine learning models are trained to predict an orientation of the vehicle with respect to at least one of a lane markings marking, a lane, or a road boundary of the environment.

5. The method of claim 1, wherein the world space trajectory is generated in 3D world space.

6. The method of claim 1, wherein the one or more machine learning models are trained to generate one or more predictions of an amount of progress of the vehicle through one or more vehicle maneuvers.

7. The method of claim 1, wherein the trajectory data representative of the world space trajectory for the vehicle is computed as one or more world space trajectory points for one or more future time steps, the one or more world space trajectory points including a height dimension.

8. The method of claim 1, wherein the one or more trajectories are determined using speed and orientation data generated using one or more additional sensors of the data collection vehicle.

9. The method of claim 8, wherein:
the speed and orientation data represent:
one or more orientations of the data collection vehicle while generating the image data; and
one or more speeds of the data collection vehicle while generating the image data; and
the one or more trajectories that the data collection vehicle navigated are determined based at least on the one or more orientations and the one or more speeds.

10. The method of claim 1, wherein the individual annotation that relates the location along the trajectory with the image relates at least a first coordinate direction location and a second coordinate location associated with a point on the trajectory with the image.

11. The method of claim 1, wherein the individual annotation is generated based at least on determining that the portion of the image data representing the image was generated while the data collection vehicle was navigating at least at one of the location along the trajectory or the trajectory.

12. The method of claim 1, wherein the one or more machine learning models are further trained based at least on:
determining, based at least on the comparing, one or more differences between the predicted trajectory and the trajectory represented by the ground truth data; and
updating, based at least on the one or more differences, one or more parameters associated with the one or more machine learning models.

13. A processor comprising:
processing circuitry to:
compute, using one or more neural networks and based at least on sensor data generated using one or more sensors of a machine, trajectory data representative of one or more world space trajectory points corresponding to one or more future time steps; and
control the machine, at least in part, according to the one or more world space trajectory points,
wherein the one or more neural networks are trained using:
ground truth data representative of world space trajectory information, the world space trajectory information corresponding to one or more trajectories used to navigate a test machine within a real-world environment;
image data generated using the test machine and at least partly while the test machine navigated the one or more trajectories within the real-world environment, the image data representative of one or more images depicting at least a portion of the real-world environment; and one or more annotations associated with the ground truth data, an individual annotation of the one or more annotations associating a point along a trajectory of the one or more trajectories with an image of the one or more images; and a comparison of the one or more trajectories to one or more predicted trajectories of the one or more machine learning models, the one or more predicted trajectories determined based at least on the one or more machine learning models processing the image data and associated with the one or more trajectories using the one or more annotations.

14. The processor of claim 13, wherein the sensor data is two-dimensional (2D) image data, the one or more sensors are one or more image sensors, and the one or more world space trajectory points are predicted using the one or more neural networks, using the 2D image data from a perspective view of the one or more image sensors, in three-dimensional (3D) space.

15. The processor of claim 13, wherein the processing circuitry is further to compute, using the one or more neural networks, data representative of at least one of an orientation of the machine or a state of the machine.

16. The processor of claim 15, wherein the orientation includes an orientation of the machine with respect to at least one of a lane marking, a lane, or a road boundary of an environment of the machine.

17. The processor of claim 15, wherein the state of the machine corresponds to an amount of progress through one or more maneuvers.

18. A system comprising:
one or more processing units to:
compute, using one or more machine learning models and based at least on sensor data generated using one or more sensors of a vehicle, trajectory data representative of a world space trajectory for the vehicle, the one or more machine learning models being trained using:
ground truth data representative of one or more trajectories used to navigate a data collection vehicle within a real-world environment;
image data generated at least partly while the data collection vehicle navigated the one or more trajectories within the real-world environment, the image data representative of one or more images depicting at least a portion of the real-world environment;

one or more annotations that relate the ground truth data to the image data, an individual annotation of the one or more annotations relating a location along a trajectory of the one or more trajectories with an image of the one or more images; and a comparison of the one or more trajectories to one or more predicted trajectories of the one or more machine learning models, the one or more predicted trajectories determined based at least on the one or more machine learning models processing the image data and associated with the one or more trajectories using the one or more annotations; and causing the vehicle to navigate based at least on the world space trajectory.

19. The system of claim 18, wherein the world space trajectory comprises one or more trajectory points, a control component uses at least a trajectory point of the one or more trajectory points to generate a control profile for the vehicle, and the control profile includes at least one of accelerating, decelerating, or turning.

20. The system of claim 18, wherein the one or more processing units are further to compute, using the one or more machine learning models, data representative of at least one of a vehicle orientation or a vehicle state, and wherein:

the vehicle orientation includes an orientation of the vehicle with respect to at least one of a lane marking, a lane, or a road boundary of the real-world environment; and the vehicle state corresponds to an amount of progress through one or more vehicle maneuvers.

* * * * *